(12) United States Patent
Rugeland et al.

(10) Patent No.: US 11,064,542 B2
(45) Date of Patent: Jul. 13, 2021

(54) METHODS AND APPARATUS FOR SIDELINK WIRELESS COMMUNICATIONS

(71) Applicant: Telefonaktiebolaget LM Ericsson (publ), Stockholm (SE)

(72) Inventors: Patrik Rugeland, Stockholm (SE); Mats Folke, Vällingby (SE); Shaohua Li, Beijing (CN); Pontus Wallentin, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 145 days.

(21) Appl. No.: 16/346,591

(22) PCT Filed: Nov. 3, 2017

(86) PCT No.: PCT/SE2017/051097
§ 371 (c)(1),
(2) Date: May 1, 2019

(87) PCT Pub. No.: WO2018/084796
PCT Pub. Date: May 11, 2018

(65) Prior Publication Data
US 2019/0373647 A1    Dec. 5, 2019

Related U.S. Application Data

(60) Provisional application No. 62/416,951, filed on Nov. 3, 2016.

(51) Int. Cl.
*H04J 3/08* (2006.01)
*H04W 76/10* (2018.01)
(Continued)

(52) U.S. Cl.
CPC .............. *H04W 76/10* (2018.02); *H04B 7/15* (2013.01); *H04W 72/0446* (2013.01); *H04W 72/085* (2013.01)

(58) Field of Classification Search
CPC ............. H04W 76/10; H04W 72/0446; H04W 72/085; H04B 7/15
(Continued)

(56) References Cited

U.S. PATENT DOCUMENTS 10,028,235 B2 * 7/2018 Kim ...................... H04W 72/12
10,869,297 B2 * 12/2020 Seo ........................ H04W 72/02
(Continued)

FOREIGN PATENT DOCUMENTS

WO    2015194916 A1    12/2015

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.3.0, Mar. 2016, pp. 1-1295.
(Continued)

*Primary Examiner* — Thai D Hoang
(74) *Attorney, Agent, or Firm* — Murphy, Bilak & Homiller, PLLC

(57) ABSTRACT

Embodiments of the present disclosure provide methods and wireless terminal devices that deal with issues relating to resource allocation in sidelink radio connections. One embodiment provides a method in a first wireless terminal device. The method comprises: establishing a sidelink radio connection with a second wireless terminal device; selecting one of a plurality of resource pools for wireless communication over the sidelink radio connection, the plurality of resource pools comprising a first resource pool and a second resource pool, the first resource pool defining a first subset of available physical resources and the second resource pool defining a second subset of available physical resources; and utilizing the selected resource pool for transmitting wireless
(Continued)

communications to the second wireless terminal device, or receiving wireless communications from the second wireless terminal device.

18 Claims, 14 Drawing Sheets

(51) Int. Cl.
   *H04B 7/15* (2006.01)
   *H04W 72/04* (2009.01)
   *H04W 72/08* (2009.01)
(58) Field of Classification Search
   USPC .......................... 370/315–326; 455/11.1–23
   See application file for complete search history.

(56) References Cited

U.S. PATENT DOCUMENTS

| | | | | |
|---|---|---|---|---|
| 10,869,331 | B2* | 12/2020 | Lee | H04W 74/04 |
| 2015/0382324 | A1 | 12/2015 | Sheng et al. | |
| 2016/0080920 | A1 | 3/2016 | Baghel et al. | |
| 2016/0295624 | A1* | 10/2016 | Novlan | H04W 72/04 |
| 2016/0338079 | A1* | 11/2016 | Yeh | H04W 72/10 |
| 2017/0188375 | A1 | 6/2017 | Seo et al. | |
| 2017/0188391 | A1* | 6/2017 | Rajagopal | H04W 74/0816 |
| 2017/0230956 | A1* | 8/2017 | Kim | H04B 1/713 |
| 2017/0245245 | A1* | 8/2017 | Kim | H04W 72/1284 |
| 2017/0289733 | A1* | 10/2017 | Rajagopal | H04W 4/70 |
| 2017/0295601 | A1* | 10/2017 | Kim | H04W 72/0406 |
| 2017/0366328 | A1* | 12/2017 | Seo | H04L 5/0055 |
| 2018/0070264 | A1* | 3/2018 | Saiwai | H04W 72/04 |
| 2018/0176891 | A1* | 6/2018 | Kim | H04L 27/26 |
| 2018/0192397 | A1* | 7/2018 | Seo | H04L 5/0044 |
| 2018/0206260 | A1* | 7/2018 | Khoryaev | H04W 72/02 |
| 2018/0212733 | A1* | 7/2018 | Khoryaev | H04L 5/0051 |
| 2018/0279258 | A1* | 9/2018 | Yasukawa | H04L 5/0053 |
| 2018/0317221 | A1* | 11/2018 | Yasukawa | H04W 72/0413 |
| 2018/0376474 | A1* | 12/2018 | Khoryaev | H04W 76/14 |
| 2019/0014563 | A1* | 1/2019 | Lee | H04W 4/40 |
| 2019/0075546 | A1* | 3/2019 | Yasukawa | H04W 92/18 |
| 2019/0090108 | A1* | 3/2019 | Wei | H04W 4/44 |
| 2020/0137758 | A1* | 4/2020 | Chae | H04W 28/04 |
| 2020/0195317 | A1* | 6/2020 | Yasukawa | H04W 16/28 |
| 2020/0205165 | A1* | 6/2020 | Huang | H04W 72/0446 |
| 2020/0205166 | A1* | 6/2020 | Huang | H04W 72/00 |
| 2020/0229029 | A1* | 7/2020 | Yasukawa | H04L 1/08 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 13)", 3GPP TS 36.213 V13.3.0, Sep. 2016, pp. 1-385.

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.3.0, Sep. 2016, pp. 1-627.

3GPP, "3rd Generation Partnership Project; Technical Specification Group Radio Access Network; Evolved Universal Terrestrial Radio Access (E-UTRA); User Equipment (UE) procedures in idle mode (Release 13)", 3GPP TS 36.304 V13.3.0, Sep. 2016, pp. 1-46.

Unknown, Author, "Connection Establishment for UE-to-NW Relaying", 3GPPP TSG-RAN WG2 Meeting #95bis, R2-166797, Nokia, Alcatel-Lucent Shanghai Bell, Kaohsiung, Taiwan, Oct. 10-14, 2016, 4 pages.

* cited by examiner

METHODS AND APPARATUS FOR SIDELINK WIRELESS COMMUNICATIONS

TECHNICAL FIELD

Examples of the present disclosure relate to methods and apparatus in the field of wireless communications, and particular to methods and apparatus for sidelink, or device-to-device communication, in a wireless cellular network.

BACKGROUND

Proximity-based Services (ProSe) were developed by 3GPP in Rel-12 as a way to provide device-to-device (D2D) communication over the LTE, also known as LTE sidelink communications. One application for this is Public Safety. The ProSe UE-to-Network Relay was also developed for public safety applications, initially to extend connectivity to out-of-coverage (OoC) UEs in 3GPP rel-13. FIG. 1 shows a network configuration for use in Public Safety, in which a remote UE 101 connects through a ProSe UE-to-Network Relay 103 over the direct UE-to-UE interface, also known as the LTE sidelink. The relay 103 connects over the Uu interface to a radio access network node such as an eNodeB (eNB) 105, which is connected to the Extended Packet Core (EPC) 107. The applications, such as Mission Critical Push to Talk (MCPTT), are served by a Public Safety Application Server (AS) 109, which is connected to the EPC over a SGi interface.

The ProSe UE-to-Network Relay node 103 may for example be a UE with capabilities to serve as relay for remote UEs. FIG. 2 shows how relaying is initiated in a network such as that shown in FIG. 1, including a Mobility Management Entity (MME) 221, Serving Gateway (S-GW) 223 and Packet Gateway (P-GW) 225 as EPC network nodes. At step 201, the relay UE sets up a PDN connection to the core network (EPC) using the Attach procedure via the eNB. At step 202, the remote UE 101 and the relay UE 103 perform a discovery procedure (using either Model A or Model B) and at step 203 they establish a connection for one-to-one communication, so that they are able to use sidelink communication over PC5. At step 204, an IP address and prefix are allocated and, at step 205, the relay UE sends a report to the MME identifying the remote user and giving IP information, and the MME sends this report to the P-GW at step 206. Thereafter, the remote UE 101 is able to send relayed traffic through the relay UE to the packet gateway. Thus, for example, the remote UE may setup a PDN connection to the network while it is in E-UTRAN network coverage. When the remote UE leaves coverage, it may start searching (using the discovery process) for a relay UE and then connect to it over the sidelink, and via the relayed data still have connectivity with the Public Safety Application Server (AS), using the PDN connection of the relay UE.

FIG. 3 is a protocol stack diagram showing the protocols in use in the network of FIG. 1. As shown in FIG. 3, the ProSe UE-to-Network Relay in rel-13 was developed as a layer 3 relay. Thus, the relaying of data takes place in the IP layer. In other words, the ProSe UE-to-Network Relay resembles the function of an IP router, and the traffic to/from the Remote UE cannot be distinguished from other traffic to/from the ProSe UE-to-Network Relay, at least not by the eNB, since the eNB does not terminate the IP layer.

In order for the ProSe UE-to-Network Relaying to begin, the ProSe UE-to-Network Relay UE and the ProSe Remote UE must first discover each other. The procedure to do this is that one of the UEs transmits a discovery message on the PC5 discovery channel, while the other UE monitors the PC5 discovery channel. There are two types of discovery types: model A and model B.

FIG. 4 illustrates model A discovery ("I am here"), in which, once the service has been authorised at step 401, the announcing UE, shown at 402a broadcasts information at step 403a at pre-defined intervals, necessary for other UEs to connect to it, which the discovering UE, shown at 402b, monitors at step 403b, and processes at step 404b when it detects a match. When applied to relay discovery, the relay UEs transmit such periodic announcements, and any remote UEs may monitor these announcements.

FIG. 5 illustrates model B discovery ("who is there?"/ "Are you there?), in which, once the service has been authorised at step 501, the announcing UE or discoverer UE, shown at 502b, transmits a request at step 503b with certain information it is interested to discover. The discovering UE, shown at 502a, monitors the PC5 link for ProSe query codes at step 503a, and can then respond at step 504a with information related to the discoverer's request if a ProSe query code matches. As shown at step 504b, the discoverer UE monitors PC5 for ProSe response codes. However, for Model B, only an authorized UE may announce or respond to the announcement. When applied to relay discovery, it is the remote UE which transmits the announcement (including some specific interest, e.g. which external network it wants to reach via the candidate relay UE), and the relay UE fulfilling the interest request will then have the opportunity to respond back.

Once the UEs have discovered each other, they can (if allowed by the network) establish a PC5 link between them and if allowed one of the UEs can be configured to relay traffic from the other UE to the network.

Recent developments in 3GPP now propose to introduce an evolved version of the ProSe UE-to-Network Relay, also known as evolved ProSe UE-to-Network Relay, where relaying is instead operated on layer 2. This development is part of the Further Enhanced D2D (FeD2D) study item in 3GPP RAN as part of Rel-14.

In LTE, the transmission resources are divided into System Frames which are 10 ms long. A system frame period consists of 1024 System Frames, with the system frame number counting from 0 to 1023. Each System Frame is divided into 10 subframes which are 1 ms long and each subframe is dived into two slots which are 0.5 ms long. Each slot consists of 8 OFDM (orthogonal frequency division multiplexed) symbols. In the frequency domain, the resources are divided into multiple 15 kHz subcarriers.

One slot (i.e. 8 OFDM symbols) and 12 subcarriers constitute a Physical Resource Block (PRB). The scheduler then maps different transport channels to different PRBs.

For D2D communication, the eNB signals to the UEs via System Information, and more specifically in System Information Block 18 (SIB18), which resources are allowed to be used for sidelink communication. This SIB indicates which subframes and resource blocks are included in the resource pool eligible for sidelink communication. This resource pool is a subset of the Physical Uplink Shared Channel (PUSCH). The resource pool is configured through the information element (IE) SL-CommResourcePool for both Tx and Rx. The IE is shown in Table 1 [copied from 3GPP specification 36.331, v 13.3.0].

TABLE 1

SL-CommResourcePool information element

```
-- ASN1START
SL-CommTxPoolList-r12 ::=           SEQUENCE (SIZE (1..maxSL-TxPool-r12)) OF SL-
CommResourcePool-r12
SL-CommTxPoolListExt-r13 ::=        SEQUENCE (SIZE (1..maxSL-TxPool-v1310)) OF SL-
CommResourcePool-r12
SL-CommRxPoolList-r12 ::=           SEQUENCE (SIZE (1..maxSL-RxPool-r12)) OF SL-
CommResourcePool-r12
SL-CommResourcePool-r12 ::=         SEQUENCE {
    sc-CP-Len-r12                       SL-CP-Len-r12,
    sc-Period-r12                       SL-PeriodComm-r12,
    sc-TF-ResourceConfig-r12            SL-TF-ResourceConfig-r12,
    data-CP-Len-r12                     SL-CP-Len-r12,
    dataHoppingConfig-r12               SL-HoppingConfigComm-r12,
    ue-SelectedResourceConfig-r12           SEQUENCE {
        data-TF-ResourceConfig-r12              SL-TF-ResourceConfig-r12,
        trpt-Subset-r12                         SL-TRPT-Subset-r12 OPTIONAL       -- Need OP
    }                                   OPTIONAL,       -- Need OR
    rxParametersNCell-r12               SEQUENCE {
        tdd-Config-r12                      TDD-Config                  OPTIONAL,    --
Need OP
        syncConfigIndex-r12                 INTEGER (0..15)
    }                                   OPTIONAL,       -- Need OR
    txParameters-r12                    SEQUENCE {
        sc-TxParameters-r12                 SL-TxParameters-r12,
        dataTxParameters-r12                SL-TxParameters-r12
    }                                   OPTIONAL,       -- Cond Tx
    ...,
    [[ priorityList-r13                 SL-PriorityList-r13         OPTIONAL   -- Cond
Tx
    ]]
}
SL-TRPT-Subset-r12 ::=              BIT STRING (SIZE (3..5))
-- ASN1STOP
```

The allocation of the sidelink resources are derived from the System Frame Number (SFN) where each SFN period consists of 1024 frames (10 ms long) or 10240 subframes 1 ms long). This SNF period is divided into equal length sidelink control (SC) periods defined by SL-PeriodComm as shown in Table 2. A value of sf40 indicates that each SC period comprises 40 subframes, a value of sf60 indicates 60 subframes and so on.

The network may configure values sf40, sf80, sf160 and sf320 for frequency division duplex (FDD) and for time division duplex (TDD) config 1 to 5, values sf70, sf140 and sf280 for TDD config 0, and finally values sf60, sf120 and sf240 for TDD config 6.

TABLE 2

SL-PeriodComm information element

```
-- ASN1START
SL-PeriodComm-r12 ::=  ENUMERATED {sf40, sf60, sf70, sf80, sf120,
sf140,
                        sf160, sf240, sf280, sf320, spare6,
spare5,
                        spare4, spare3, spare2, spare}
-- ASN1STOP
```

Furthermore, the IE SL-TF-ResourceConfig specifies a set of time and/or frequency resources used for the physical sidelink control channel (PSCCH), indicating which physical resource blocks and subframes are to be used for sidelink control information (SCI).

TABLE 3

SL-TF-ResourceConfig information element

```
-- ASN1START
SL-TF-ResourceConfig-r12 ::=    SEQUENCE {
    prb-Num-r12                     INTEGER (1..100),
    prb-Start-r12                   INTEGER (0..99),
    prb-End-r12                     INTEGER (0..99),
    offsetIndicator-r12             SL-OffsetIndicator-r12,
    subframeBitmap-r12              SubframeBitmapSL-r12
}
SubframeBitmapSL-r12 ::=        CHOICE {
    bs4-r12                         BIT STRING (SIZE (4)),
    bs8-r12                         BIT STRING (SIZE (8)),
    bs12-r12                        BIT STRING (SIZE (12)),
    bs16-r12                        BIT STRING (SIZE (16)),
    bs30-r12                        BIT STRING (SIZE (30)),
    bs40-r12                        BIT STRING (SIZE (40)),
    bs42-r12                        BIT STRING (SIZE (42))
}
-- ASN1STOP
```

Where prb-Num-r12 indicates the number of resource blocks prb-Start-r12 indicates the beginning of the first resource block prb-End-r12 indicates the end of the second resource block.

This means that there will be two groups of resource blocks:

1. prb-Start-r12: prb-Start-r12+prb-Num-r12
2. prb-End-r12−prb-Num-r12: prb-End-r12

Unless the two groups overlap, in which case there will only be one (larger) group.

OffsetIndicator-r12 indicates the number of subframes between SFN=0 and the beginning of the first sidelink control (SC) period. If OffsetIndicator-r12=0 then the first SC period starts at SFN=0.

subframeBitmap-r12 is a bitmap (i.e. a string of '1's and '0's) where each '1' indicates that a particular subframe is used for sidelink control signal. The subframeBitmap-r12 can be [4,8,12,16,30,40,42] bits long. The network configures value bs40 (indicaing 40 bits) for FDD and the following values for TDD: value bs42 for configuration 0, value bs16 for configuration 1, value bs8 for configuration 2, value bs12 for configuration 3, value bs8 for configuration 4, value bs4 for configuration 5 and value bs30 for configuration 6. After the last '1' in the subframeBitmap, where the control signals finish, the subsequent subframes within the SC period can be used for sidelink data transfer via the physical sidelink shared channel (PSSCH).

The parameter ue-SelectedResourceConfig-r12 in Table 1, is optional to transmit in SIB18. If it is missing, the UE sidelink communication is in Mode 1 (eNB controlled) and if it is present, the sidelink communication is in Mode 2 (UE controlled). Furthermore, in Mode 2 the parameter SL-TRPT-Subset-r12 can optionally be included in SIB18.

In Mode 1, the data transmission on PSSCH, is performed on the remaining subframes within the SC period after the last PSCCH resource, and is signaled via PSCCH within each SC using a dedicated signaling of an 8-bitstring TRPT (Time-resource pattern table). Alternatively, the TRPT allocation can be seen as semi-persistent and the same allocation can be used for several SC periods. If more than 8 subframes remain in the SC period for the PSSCH (i.e. after the last PSCCH resource), the TRP is repeated and the last repetition may be truncated.

For Mode 2, the eNB broadcasts an information element data-TF-ResourceConfig-r12 in SIB18 which indicates which subframes and resource blocks are to be used by PSSCH, similar to the one defining PSCCH (i.e., using the same structure). The eNB can decide whether the PSCCH and the PSSCH resources overlap or not.

If the additional optional parameter SL-TRPT-Subset-r12 is excluded, all subframes indicated by data-TF-ResourceConfig-r12 can be used for sidelink communication. However, if the parameter SL-TRPT-Subset-r12 is included in SIB, it will be a bitstring of 3-5 bits, depending on which FDD/TDD UL/DL configuration is used as can be seen in Table 4.

TABLE 4

Determination of $X_{TRP}$ and $k_i$ for sidelink transmission mode 2

| | $X_{TRP}$ | $k_0$ | $k_1$ | $k_2$ | $k_3$ | $k_4$ |
|---|---|---|---|---|---|---|
| FDD and TDD with UL/DL configuration 1, 2, 4, 5 | 3 | 1 | 2 | 4 | — | — |
| TDD with UL/DL configuration 0 | 5 | 1 | 2 | 3 | 4 | 5 |
| TDD with UL/DL configuration 3, 6 | 4 | 1 | 2 | 3 | 4 | — |

Where $X_{TRP}$ is the number of bits in the bitstring of SL-TRPT-Subset-r12. This parameter maps to an 8 bitstring of TRP, where $k_i$, indicate how many '1's are in the TRP.

For example, if $X_{TRP}=3$, and SL-TRPT-Subset-r12=1,0, 0), then the possible TRP allocations have only one '1', e.g. 1,0,0,0,0,0,0,0), or any other permutation (as seen in table 14.1.1.1.1-1, 14.1.1.1.1-2, and 14.1.1.1.1-3 in TS36.213, v.13.3.0).

If $X_{TRP}=3$, and SL-TRPT-Subset-r12=1,0,1), then the possible TRP allocations have only one '1' OR four '1's; e.g. 1,0,0,0,0,0,0,0), or any other permutation or 1,1,1,1,0,0,0,0) or any permutation (as seen in table 14.1.1.1.1-1, 14.1.1.1.1-2, and 14.1.1.1.1-3 in TS36.213, v.13.3.0).

Since in Mode 2, the transmitting UE decides by itself which Imp to use, the receiving UE needs to monitor all PSSCH resources.

The configurations 0-6) referred to above are various TDD UL/DL configurations defined in the serving cell, which governs several different aspects described in TS 36.213, v.13.3.0.

In addition to the physical sidelink shared channel (PSSCH) and the physical sidelink control channel (PSCCH), there is also a physical sidelink discovery channel (PSDCH) defined. The configurations for this channel are broadcasted by the eNB in system information (specifically in system information block SIB19) and the information element is shown in Table 5.

TABLE 5

SL-DiscResourcePool information element

```
-- ASN1START
SL-DiscTxPoolList-r12 ::=      SEQUENCE (SIZE (1..maxSL-TxPool-r12)) OF SL-DiscResourcePool-r12
SL-DiscRxPoolList-r12 ::=      SEQUENCE (SIZE (1..maxSL-RxPool-r12)) OF SL-DiscResourcePool-r12
SL-DiscResourcePool-r12 ::=    SEQUENCE {
    cp-Len-r12                     SL-CP-Len-r12,
    discPeriod-r12                 ENUMERATED {rf32, rf64, rf128,
                                       rf256, rf512, rf1024, rf16-v1310, spare},
    numRetx-r12                INTEGER (0..3),
    numRepetition-r12          INTEGER (1..50),
    tf-ResourceConfig-r12      SL-TF-ResourceConfig-r12,
    txParameters-r12           SEQUENCE {
        txParametersGeneral-r12    SL-TxParameters-r12,
        ue-SelectedResourceConfig-r12  SEQUENCE {
            poolSelection-r12          CHOICE {
                rsrpBased-r12              SL-PoolSelectionConfig-r12,
                random-r12                 NULL
            },
            txProbability-r12          ENUMERATED {p25, p50, p75, p100}
        }                                                     OPTIONAL    -- Need OR
    }                                                         OPTIONAL,   -- Cond Tx
    rxParameters-r12           SEQUENCE {
        tdd-Config-r12             TDD-Config
        syncConfigIndex-r12        INTEGER (0..15)
    }                                                         OPTIONAL,   -- Need OR
    ...,
    [[ discPeriod-v1310            CHOICE {
           release                     NULL,
```

TABLE 5-continued

SL-DiscResourcePool information element

```
            setup                          ENUMERATED {rf4, rf6, rf7, rf8,
                                               rf12, rf14, rf24, rf28}
         }                                                        OPTIONAL,   -- Need ON
      rxParamsAddNeighFreq-r13      CHOICE {
         release                       NULL,
         setup                         SEQUENCE {
            physCellId-r13                PhysCellIdList-r13
         }
      }                                                           OPTIONAL,   -- Need ON
      txParamsAddNeighFreq-r13      CHOICE {
         release                       NULL,
         setup                         SEQUENCE {
            physCellId-r13                PhysCellIdList-r13,
            p-Max                         P-Max             OPTIONAL,       -- Need OP
            tdd-Config-r13                TDD-Config        OPTIONAL,       -- Cond TDD-
OR
            tdd-Config-v1130              TDD-Config-v1130  OPTIONAL,       -- Cond TDD-
OR
            freqInfo                      SEQUENCE {
               ul-CarrierFreq                ARFCN-ValueEUTRA  OPTIONAL,  -- Need
OP
               ul-Bandwidth                  ENUMERATED {n6, n15, n25, n50, n75, n100}
                                                                OPTIONAL,  -- Need
OP
            additionalSpectrumEmission    AdditionalSpectrumEmission
            },
            referenceSignalPower          INTEGER (-60..50),
            syncConfigIndex-r13           INTEGER (0..15)    OPTIONAL   -- Need OR
         }
      }                                                           OPTIONAL   -- Need ON
   ]]
}
PhysCellIdList-r13 ::=    SEQUENCE (SIZE (1.. maxSL-DiscCells-r13)) OF PhysCellId
SL-PoolSelectionConfig-r12 ::=    SEQUENCE {
   threshLow-r12                    RSRP-RangeSL2-r12,
   threshHigh-r12                   RSRP-RangeSL2-r12
}
-- ASN1STOP
```

Similarly to the sidelink control channel, the time-frequency resources are defined by the parameter SL-TF-ResourceConfig-r12 (shown in Table 3). However, the periodicity is not linked to the sidelink control period, but instead is defined by the parameter discPeriod-r12, which indicates which subframes and which PRBs can be used. As the discovery period can be longer than the largest period in SL-TF-ResourceConfig-r12 (i.e. the subframeBitmap-r12 which is maximum 40 bits, or 40 ms, while the discovery period can be up to 10.24 s), the subframeBitmap can be repeated between 1 and 50 times, indicated by the parameter numRepetition-r12.

The procedure for ProSe Direct discovery can be seen in FIG. 4 and FIG. 5. As can be seen, only UEs authorized to use the sidelink discovery channel are allowed to transmit or receive on the sidelink discovery channel.

For the LTE Uu interface (i.e. the interface between the UE and the eNB), discontinuous reception (DRX) was introduced to reduce power consumption and increase the battery lifetime of the UE. DRX was defined for both RRC_IDLE and RRC_CONNECTED modes.

For UEs with small and infrequent data, DRX allows the UE to turn off its Tx/Rx antennas between transmissions, which greatly reduces power consumption.

An eNB can configure a UE with DRX before it enters RRC_IDLE so that the UE only monitors paging occasions once during each DRX cycle. In order for the UEs in RRC_IDLE to both save power and be able to receive messages from the network, s paging mechanism is designed to wake the UE up when data is available for downlink transmission to the UE. UEs in RRC_IDLE monitor the PDCCH channel for a radio network temporary identifier (RNTI) value used to indicate paging: the P-RNTI. The UE only needs to monitor the PDCCH channel at certain UE-specific occasions (i.e. at specific subframes within specific radio frames). At other times, the UE may apply DRX, meaning that it can switch off its receiver to preserve battery power.

The network configures which of the radio frames and subframes are used for paging. These DRX configurations are broadcast in system information (particularly in system information block SIB2) in the RadioResourceConfigCommon information element with the parameter defaultPagingCycle, which is used to derive the DRX cycle of the UE (i.e. the value 'T' in TS 36.304, v 13.3.0). A value of rf32 corresponds to 32 radio frames, rf64 corresponds to 64 radio frames and so on.

A UE can also be configured with DRX when in RRC_CONNECTED mode, where the eNB fully configures the activity of the UE.

The DRX in RRC_CONNECTED is characterized by short, periodic on-duration phases in which data transfer may start. The UE monitors the control channel during these phases, and may turn off its receiver and enter a low energy state if data transfer does not occur in an on-duration phase. The on-duration phases may be periodic with a relatively long period (long DRX cycle) or a relatively short period (short DRX cycle). The value of on-duration is the duration in downlink subframes that the UE waits for, after waking up, to receive PDCCHs.

Whenever the UE detects data during an on-duration phase (e.g. on DL-SCH), it starts an inactivityTimer and shortCycleTimer. The inactivityTimer is the duration in downlink subframes that the UE waits to successfully decode a PDCCH, from the last successful decoding of a PDCCH (for NB-IoT, from the end of the transmission/re-transmission of each MAC PDU), failing which it re-enters a DRX sleep cycle (usually the short DRX cycle). The UE shall restart the inactivity timer following a single successful decoding of a PDCCH for a first transmission only (i.e. not for retransmissions).

Once the shortCycleTimer expires with no further activity during the on-duration periods, the UE may change from the short DX cycle to the long DRX cycle.

The active-time is the total duration that the UE is awake. This includes the "on-duration" of the DRX cycle, the time UE is performing continuous reception while the inactivity timer has not expired and the time UE is performing continuous reception while waiting for a DL retransmission after one HARQ RTT or, for asynchronous UL HARQ operation, for an UL retransmission grant after one UL HARQ RTT. Based on the above the minimum active time is of length equal to on-duration, and the maximum is undefined (infinite).

The lengths of on-duration, inactivityTimer and shortCycleTimer are fixed by the RRC configuration of the UE, while the active-time is of varying lengths instantaneously based on scheduling decisions.

Of the above parameters the on-duration and inactivity-timer are of fixed lengths, while the active-time is of varying lengths based on scheduling decision and UE decoding success. Only on-duration and inactivity-timer duration are signalled to the UE by the eNB:

There is only one DRX configuration applied in the UE at any one time;

UE shall apply an on-duration on wake-up from DRX sleep;

New transmissions can only take place during the active-time (so that when the UE is waiting for one retransmission only, it does not have to be "awake" during the RTT).

If PDCCH has not been successfully decoded during the on-duration, the UE shall follow the DRX configuration (i.e. the UE can enter DRX sleep if allowed by the DRX configuration):

This applies also for the sub-frames where the UE has been allocated predefined resources.

If it successfully decodes a PDCCH for a first transmission, the UE shall stay awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules:

If a short DRX cycle is configured, the UE first follows the short DRX cycle and after a longer period of inactivity the UE follows the long DRX cycle;

Else the UE follows the long DRX cycle directly.

SUMMARY

According to embodiments of the present disclosure, there are provided methods and wireless terminal devices that deal with issues relating to resource allocation in sidelink radio connections.

In one aspect, there is provided a method in a first wireless terminal device. The method comprises: establishing a sidelink radio connection with a second wireless terminal device; selecting one of a plurality of resource pools for wireless communication over the sidelink radio connection, the plurality of resource pools comprising a first resource pool and a second resource pool, the first resource pool defining a first subset of available physical resources and the second resource pool defining a second subset of available physical resources; and utilizing the selected resource pool for transmitting wireless communications to the second wireless terminal device, or receiving wireless communications from the second wireless terminal device.

Further aspects of the disclosure provide apparatus configured to perform the method set out above.

DETAILED DESCRIPTION

Figure 1:
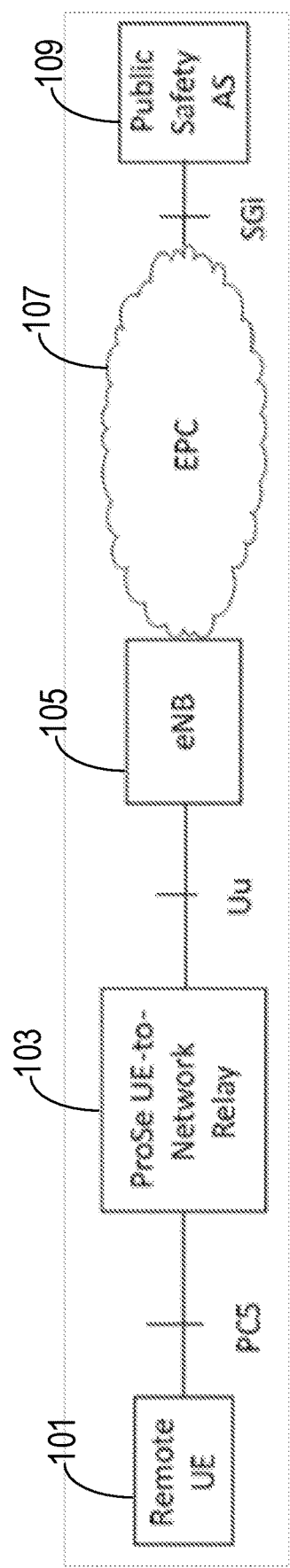
FIG. 1 shows a part of a network.
Figure 2:
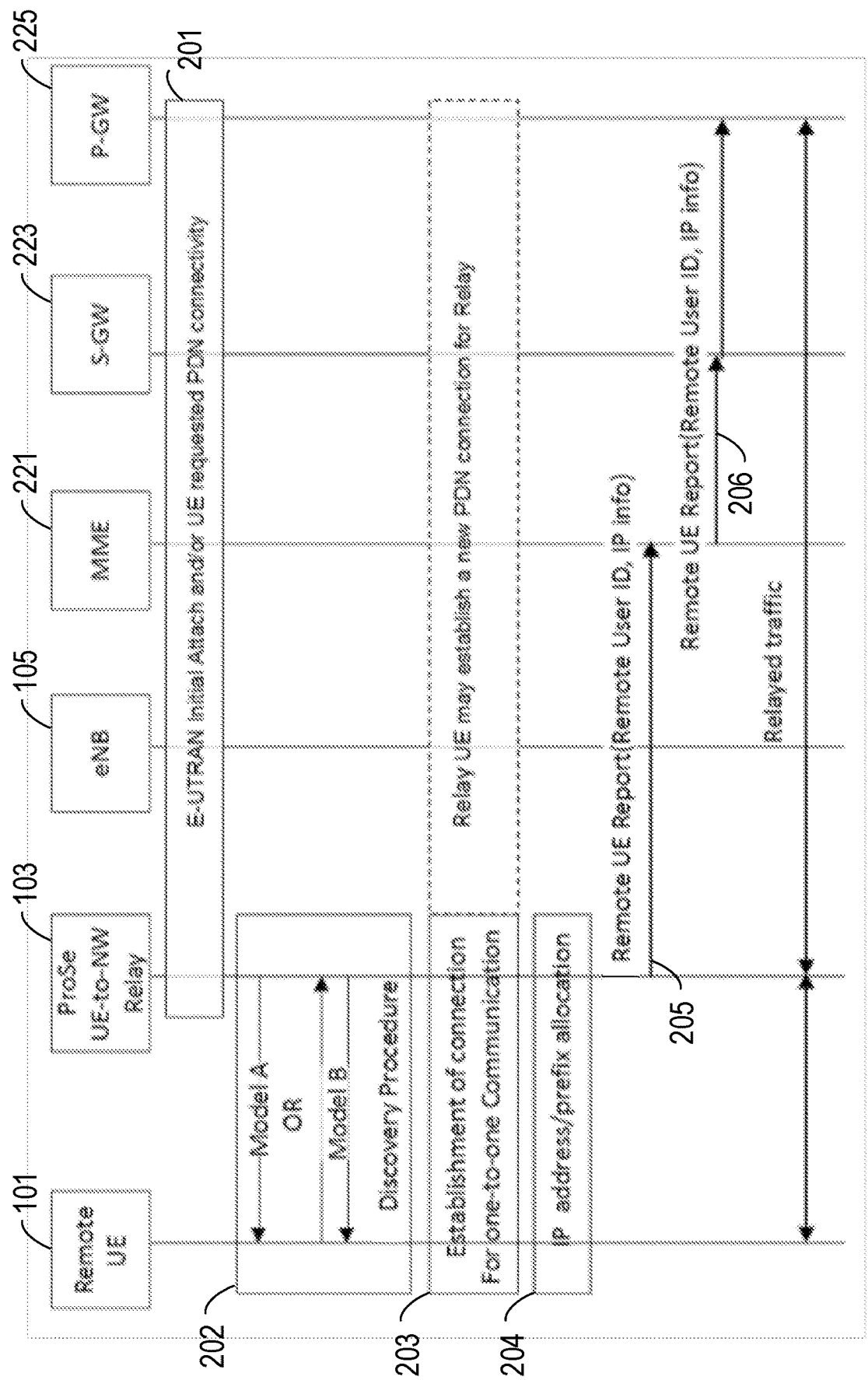
FIG. 2 illustrates signalling in the network of FIG. 1.
Figure 3:
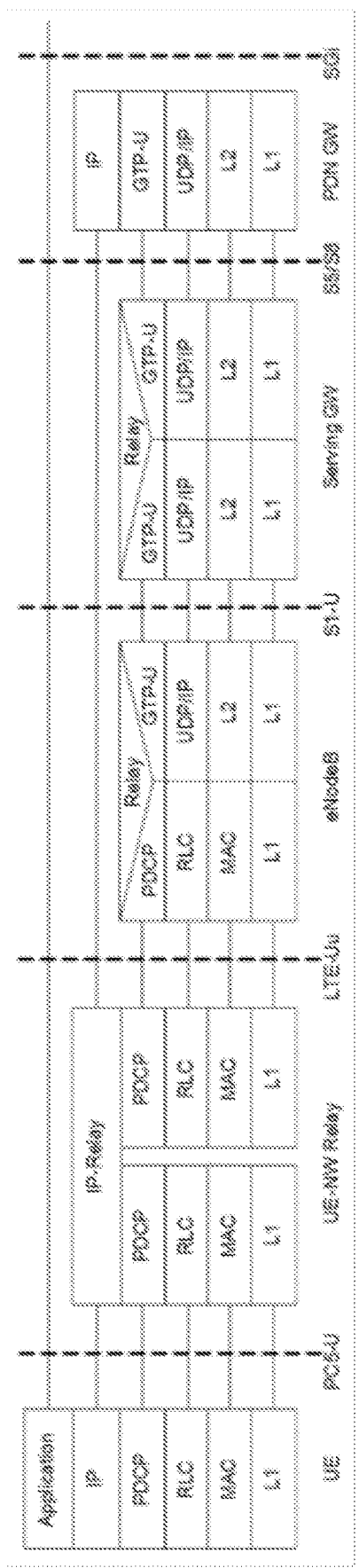
FIG. 3 illustrates a protocol architecture in the network of FIG. 1.

Further enhanced device-to-device (FeD2D) with ProSe UE-to-Network Relay aims to reduce the power consumption of the remote UE by using a more power-efficient short distance access e.g. PC5 D2D communication to a Relay UE which forwards the traffic between the eNB and a Remote UE. See FIG. 1 for an example of such a scenario.

As the Remote UE may have infrequent data, either in UL or DL, it is unnecessary for the Remote UE to maintain a persistent link to the Relay UE during inactive periods. However, once the Remote UE has data to receive or transmit, it needs to quickly and efficiently access the Relay UE. Standardized resource pools are fairly dense, requiring the UEs to monitor PSSCH and PSCCH very frequently.

In order to address these and other problems, embodiments of the disclosure provide methods and apparatus in which multiple resource pools are defined and available for sidelink communications. Each resource pool may define a subset of the available physical resources (i.e. one or more frequency sub-bands, one or more subframes, physical resource blocks, etc) on which signals can be transmitted wirelessly or received wirelessly over an established sidelink radio connection.

One or more of the resource pools may be a traditional, or dense resource pool, i.e., one as defined in the background section above, or as in Release 13 of the 3GPP specifications. The dense resource pool may be optimized for data transfer over the sidelink radio connection (i.e., optimizing or maximizing data transfer rates, bandwidth, minimizing latency, etc). The dense resource pool may comprise relatively more physical resources, or physical resources that are closer together in time (i.e., such that a wireless terminal device utilizing the dense resource pool must monitor channels associated with the sidelink radio connection relatively more often.

One or more of the resource pools may be a sparse resource pool, i.e. a resource pool defining relatively few physical resources, or physical resources that are more spaced apart in time than the dense resource pool (i.e., such that a wireless terminal device utilizing the sparse resource pool may monitor channels associated with the sidelink radio connection relatively less often than if utilizing the dense resource pool). The sparse resource pool may also have narrower bandwidth (i.e. contain fewer resource blocks per subframe) compared to the dense resource pool such that a wireless terminal device utilizing the sparse resource pool may monitor a smaller frequency range which may reduce the power consumption of the transceiver circuitry in the on-duration. The sparse resource pool may allow a wireless terminal device to power its transceiver circuitry down between active periods, in a manner analogous to current DRX methods for the downlink. The sparse resource pool may be optimized for power saving in the wireless terminal device, rather than data transfer.

Figure 6:
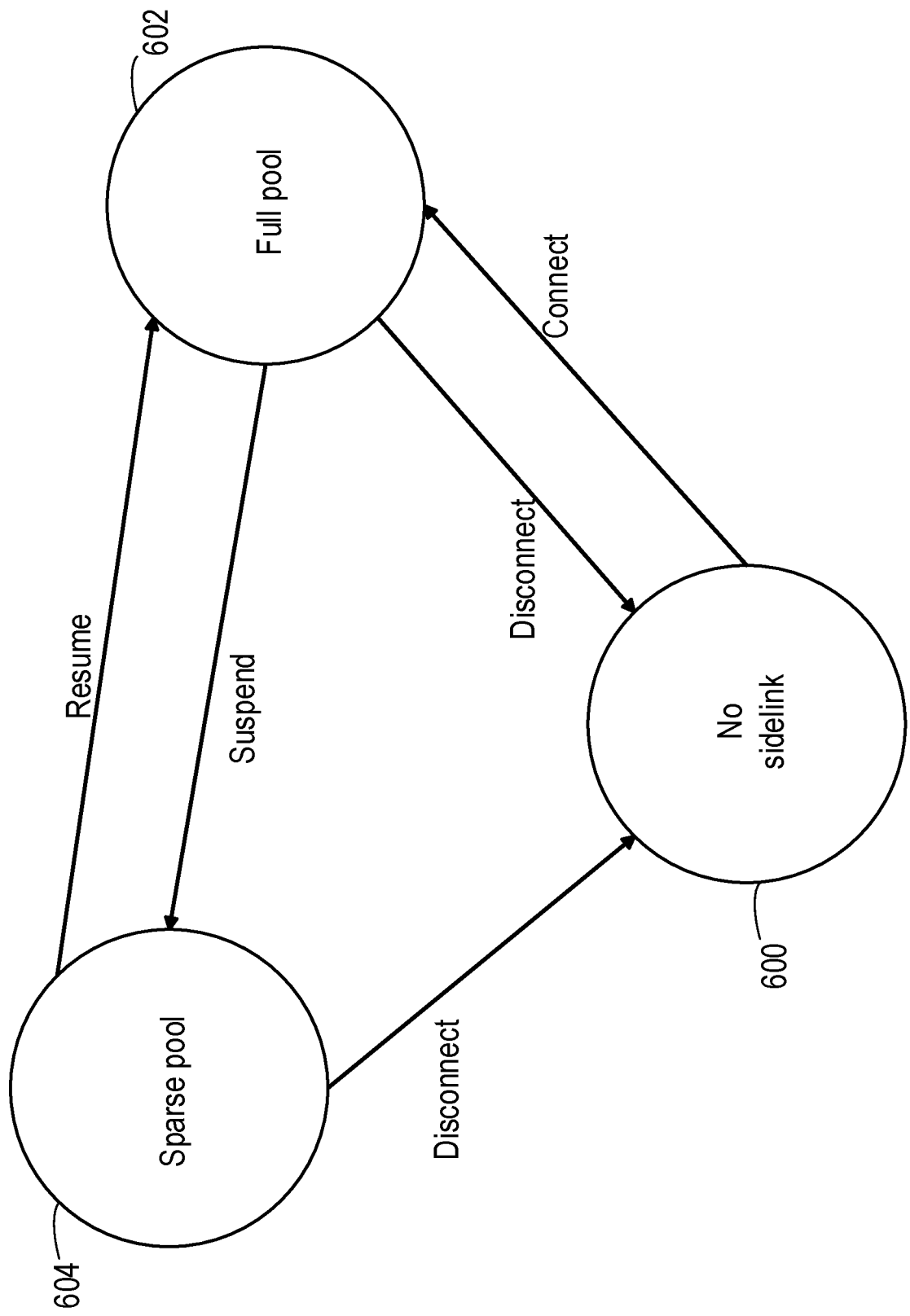
FIG. 6 is a state diagram of a wireless terminal device utilizing sidelink communications.

FIG. 6 is a state diagram of a first wireless terminal device utilizing sidelink communications with a second wireless terminal device. The first wireless terminal device may act as a relay for the second wireless terminal device, transmitting communications received from a network node (such as an eNB) for the second wireless terminal device to the second wireless terminal device, and transmitting communications received from the second wireless terminal device for the network node to the network node. Alternatively, the first wireless terminal device may be the "remote" device, and the second wireless terminal device the relay device. In a further alternative, neither device acts as a relay (for example one-to-one ProSe direct communication, also known as unicast D2D communication; one-to-many ProSe direct communication, also known as multicast D2D communication).

In a first state 600, "No sidelink", the sidelink radio connection is not established with the second wireless terminal device and thus no resource pool is configured for the device.

In a second state 602, "Full pool", the sidelink radio connection is established, and moreover a traditional or dense resource pool (as defined above) is utilized for the radio connection. Thus the resource pool, used in the Full pool state 602 may e.g. be defined as in Release 13 of the 3GPP specifications. The resource pool used in the Full pool state 602 may be optimized for data transfer over the sidelink radio connection (i.e., optimizing or maximizing data transfer rates, bandwidth, minimizing latency, etc). This resource pool, defined here as the "full resource pool" or alternatively as the "dense resource pool" may comprise relatively more physical resources, or physical resources that are closer together in time (i.e., such that a wireless terminal device utilizing the full resource pool must monitor channels associated with the sidelink radio connection relatively more often and/or with a wider bandwidth).

In a third state 604, "Sparse pool", the sidelink radio connection is established and a sparse resource pool (as defined above and detailed further below) is utilized for the radio connection. The resource pool used in the Sparse pool state 604, defined here as the "sparse resource pool", may define relatively few physical resources (i.e. compared to the full resource pool). Alternatively or additionally, the sparse resource pool may define physical resources that are more spaced apart in time than the full resource pool (i.e., such that a wireless terminal device utilizing the sparse resource pool used in the Sparse pool state 604 may monitor channels associated with the sidelink radio connection relatively less often than if utilizing the full resource pool used in the Full pool state 602). Alternatively or additionally, the sparse resource pool may define physical resources that have a narrower bandwidth, i.e. a narrower range of frequencies, than the full resource pool (i.e., such that a wireless terminal device utilizing the sparse resource pool may monitor channels associated with the sidelink radio connection with narrower bandwidth than if utilizing the full resource pool used in the Full pool state 602). The sparse resource pool may allow a wireless terminal device to power its transceiver circuitry down between active periods, in a manner analogous to current DRX methods for the downlink. The sparse resource pool may be optimized for power saving in the wireless terminal device, rather than data transfer.

Both the Full pool state 602 and the Sparse pool state 604 may comprise single configurations of physical resources or a plurality of alternative configurations from which the wireless terminal may select (or be instructed to select).

Further, a wireless terminal device may utilize different resource pools (or be in different states) for transmitting and receiving signals over the sidelink radio connection. For example, the first wireless terminal device may utilize the full resource pool for transmission (or one or more of the multiple full resource pools for transmission), and the sparse resource pool for reception (or one or more of the multiple sparse resource pools for reception). Thus, in such a configuration, and where the sparse resource pool contains resources that are separated in time to a greater extent that the full resource pool, the first wireless terminal device must only monitor the sidelink channel(s) for transmissions by the second wireless terminal device relatively infrequently. Where the sparse resource pool contains resources that are relatively narrower in bandwidth than the full resource pool (i.e. defining fewer resource blocks per subframe than the full resource pool), the first wireless terminal device must only monitor narrower sidelink channel(s), reducing the power consumption of the first wireless terminal device even if the periodicity of the sparse resource pool and the dense resource pool are the same. In embodiments where the sparse resource pool is sparser in both time (subframe allocation periodicity) and frequency (resource block allocation per subframe) relative to the full resource pool, power savings may result from both the time domain and the frequency domain.

One advantage of this embodiment is that the wireless terminal devices involved in sidelink communication can remain, for example, in an RRC_CONNECTED state even during inactive periods (i.e. when the devices have no data to transmit) but with a greatly reduced power consumption. When the devices need to re-establish connectivity, it can quickly be resumed by changing to a full or dense resource pool.

Figure 4:
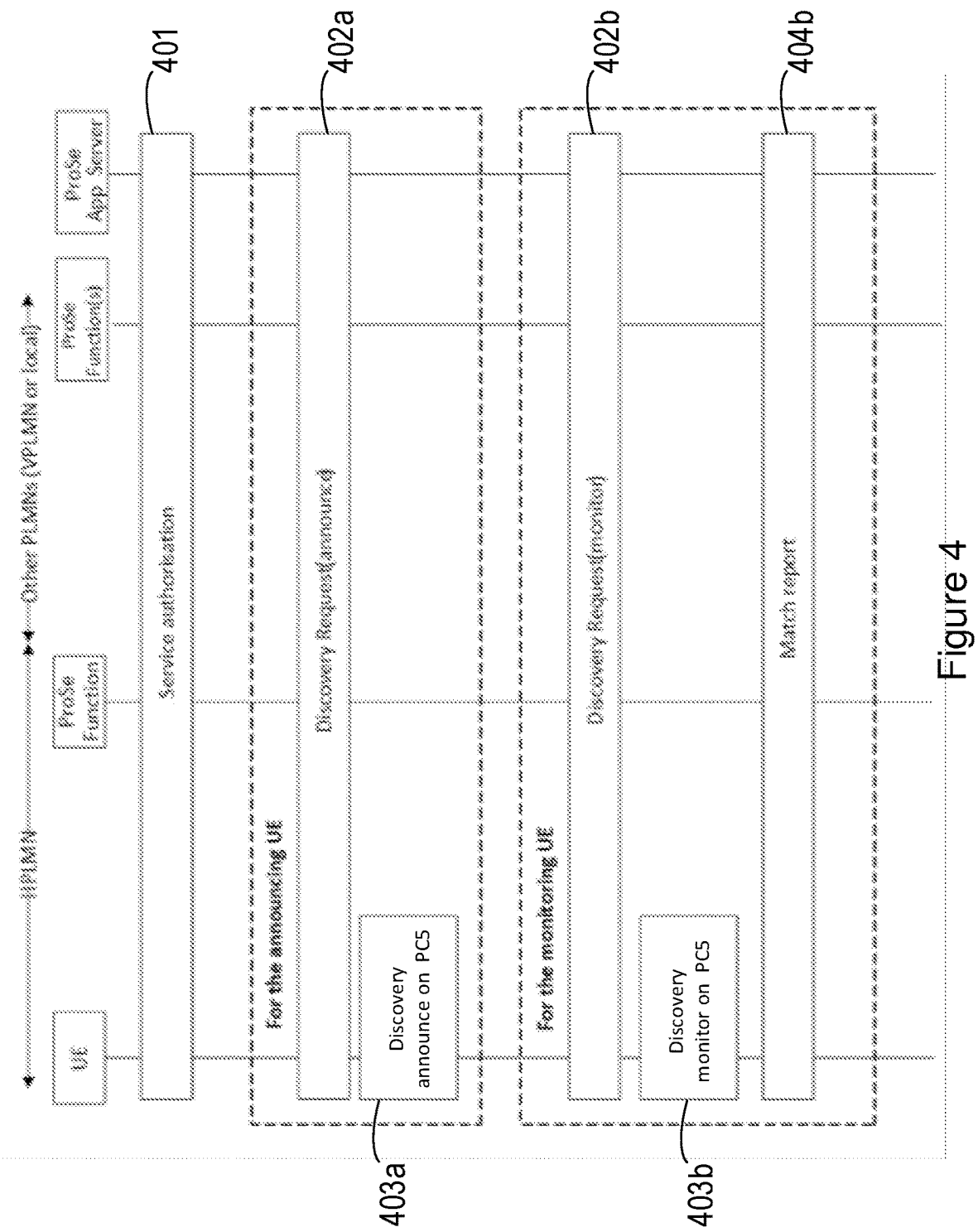
FIG. 4 illustrates signalling in the network of FIG. 1.
Figure 5:
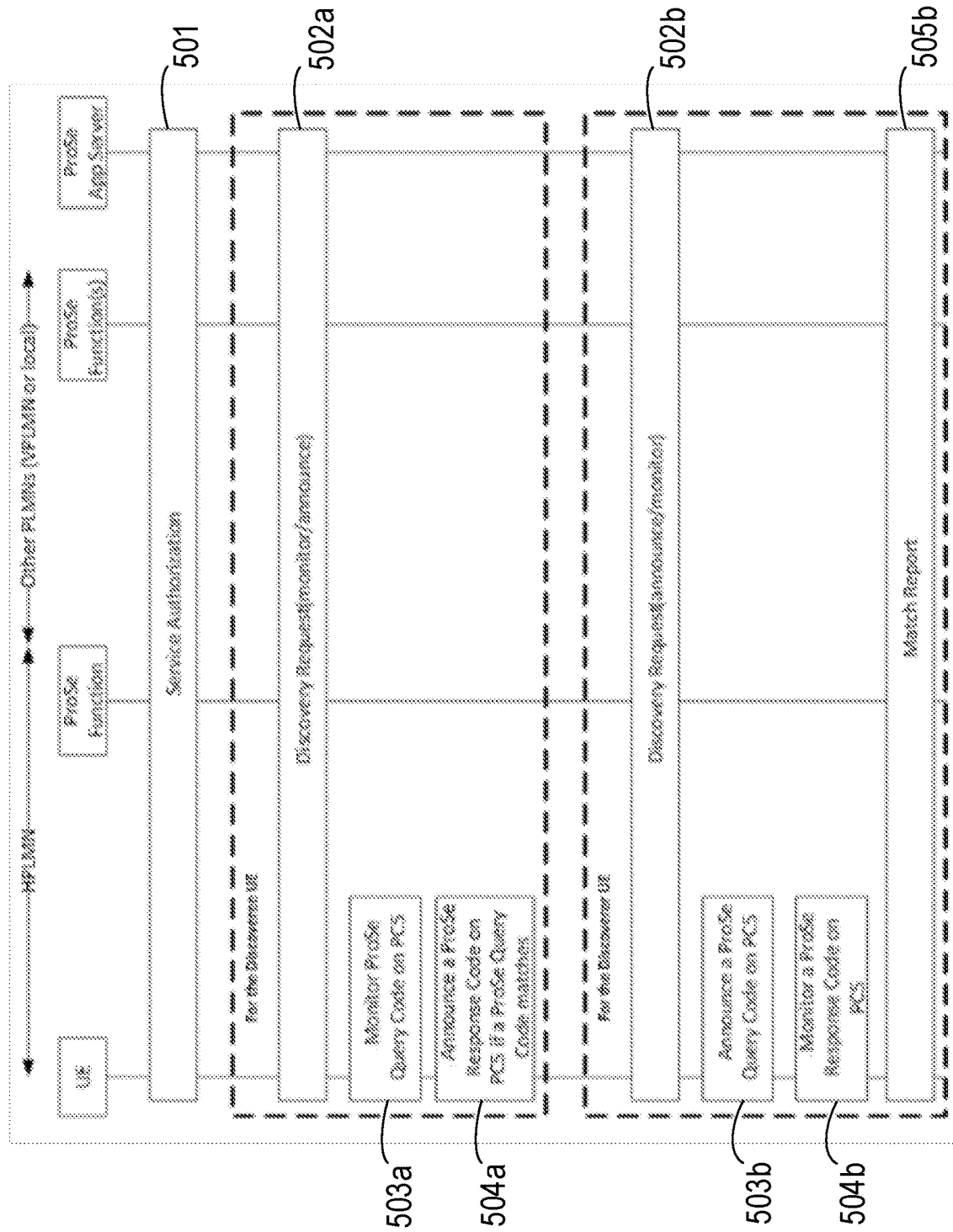
FIG. 5 illustrates signalling in the network of FIG. 1.

Upon initial establishment of a sidelink radio connection (e.g. as described above with respect to FIGS. 4 and 5), it is expected that the first wireless terminal device will transition from the "no sidelink" state 600 to the "Full pool" state 602. That is, the traditional, full resource pool is used to define physical resources for the first wireless terminal device (and also the second wireless terminal device) upon initial establishment of a connection between them. The connect transition may involve relay selection, and setting up the connection. The transition may be initiated by either of the devices (or any of the devices if a sidelink connection is established with more than one device) or a network node (such as an eNB). The transition may be triggered by data from higher layers in the network.

The first wireless terminal device may also transition from the Full pool state 602 to the "no sidelink" state 600 upon disconnection from the second wireless terminal device ("disconnect" transition). This involves the release of physical resources (i.e. for the sidelink interface, or PC5 interface). Either wireless terminal device can initiate this, e.g., in response to a command from a network node (such as an eNB), expiry of an inactivity timer, low battery, bad channel quality, user input etc.

According to embodiments of the disclosure, the first wireless terminal device may also transition from the Full pool state 602 to the Sparse pool state 604 ("suspend" transition). Either of the wireless terminal devices can initiate the transition. The triggers for the transition may be similar to those for the disconnect transition. However, they generally involve shorter timers, less bad quality thresholds, etc. For example, the suspend transition may trigger in response to a command from a network node (such as an eNB), expiry of an inactivity timer (albeit that the timer may be shorter than the timer for the transition from Full pool state 602 to No sidelink state 600), low battery (albeit that the threshold remaining battery power may be higher than the threshold for the transition from Full pool state 602 to No sidelink state 600), disconnection from an external power source, bad channel quality (albeit that the threshold remaining battery power may be higher than the threshold for the transition from Full pool state 602 to No sidelink state 600), etc.

The first wireless terminal device may further transition from the Sparse pool state 604 to the Full pool state 602 ("resume" transition). Either of the wireless terminal devices may initiate the transition. The triggers for the transition may involve similar triggers for the suspend transition, but operating in the reverse manner, e.g. channel quality that is above a threshold, or battery power that is above a threshold (or connection to an external power source). Note that the thresholds may be the same as for the suspend transition, or different, for example, so as to build some hysteresis into the system and prevent rapid and repeated switching between the states. The triggers may also comprise one or more of: data to be transmitted that is over a threshold amount of data (e.g. in some embodiments the transition may take place when either device has any data to transmit), a latency (QoS) requirement related to a service that has been requested by a user of either device, data being received over the sidelink from the second wireless terminal device (perhaps with specific properties e.g. high priority, or corresponding to a Paging message), expiry of a timer initiated or activated in the first wireless terminal device upon the first wireless terminal device entering the Sparse pool state 604 (e.g. performing a "suspend" transition). In the latter case, the first wireless terminal device may therefore spend a predetermined time in the Sparse pool state 604 before transitioning out of the Sparse pool state 604. For example, the first wireless terminal device may follow a repeating pattern of transitions between the Full and Sparse pool states 602, 604.

The full resource pool allows for a discontinuous transmission between two wireless terminal devices. However, as described in the background above, the configurations do not allow for particularly sparse Tx/Rx in which a device may power down its transceiver circuitry, with at minimum Tx/Rx in one subframe for every eight subframes for Mode 1 (eNB controlled scheduling) or one subframe every 40 ms for Mode 2 (wireless terminal device controlled scheduling).

The sparse resource pool may be defined or configured in a number of different ways.

For example, it will be recalled from the discussion above that, in LTE, the transmission resources are divided into System Frames which are 10 ms long. A system frame period consists of 1024 System Frames, with the system frame number counting from 0 to 1023. Each System Frame is divided into 10 subframes which are 1 ms long and each subframe is dived into two slots which are 0.5 ms long. Each slot consists of 8 OFDM (orthogonal frequency division multiplexed) symbols. In the frequency domain, the resources are divided into multiple 15 kHz subcarriers.

The sparse resource pool may be configured with reference to an offset indicator, which indicates a timing offset (e.g. in subframes) between the beginning of a system frame period (i.e. where SFN=0) and the beginning of an initial period (i.e. the first period in the system frame period) for sidelink transmissions within each system frame period. For example, the offset indicator may comprise the SL-Offset-Indicator-r12 parameter defined in the 3GPP specifications, received from a network node (e.g. in system information).

According to those 3GPP specifications, further sidelink control (SC) periods follow the first SC period at regular intervals until the end of the system frame period. However, in embodiments of the disclosure, the offset indicator may give an offset that limits the number of SC periods within each system frame period. For example, the offset indicator may be set to a value such that the first SC period within each system frame period does not begin until near the end of the system frame period, e.g. in the last system frame number (thus reducing the subframes available for repetitions of the SC period).

In one embodiment, the offset indicator may be set to a value such that only a single SC period is possible within each system frame period. For example, if the parameter OffsetIndicator-r12=10200. This means that the first sidelink control (SC) period will occur 10.200 seconds after system frame number (SFN)=0, with a duration of 40 ms (which is the typical SC period duration for FDD). Thus the wireless terminal device must only monitor for signals every 10.2 seconds, and may power down its transceiver circuitry at other times.

Further, during the SC period, the terminal devices can be instructed to have one DL subframe (e.g., Tx for first wireless terminal device and Rx for second wireless terminal device) and one UL subframe (e.g., Rx for first wireless terminal device and Tx for second wireless terminal device). The subframe bitmap can be designed such that there are some or no subframes left for the data transfer over the physical sidelink shared channel (PSSCH, sidelink communication channel). Once SFN=1023, the counter resets and the next sidelink sparse resource pool will be after another 10.200 s.

In another embodiment, the sparse resource pool may be configured with reference to one or more bitmaps, such as a time resource pattern table (TRPT). The bitmap may be set to null (i.e. including zero positive values), such that one or more channels of the sidelink radio connection are not monitored.

In this and other embodiments, the sparse resource pool may configure resources for control signals (i.e. the PSCCH) and data signals (i.e. the PSSCH) separately. That is, one set of physical resources may be reserved for the transfer of control signals, while another, different set of physical resources may be reserved for the transfer of data signals. In one embodiment, the sparse resource pool may contain no or very limited resources reserved for the transfer of data signals.

It is defined above and in the relevant 3GPP standards that each period reserved for sidelink communications (i.e. each SC period) comprises a control channel (i.e. the PSCCH) and a data channel (i.e. the PSSCH). A number of initial subframes of the SC period are reserved for the control channel, with the remaining subframes allocated for the data channel. The usage of those remaining frames is defined by a bitmap, the TRPT, which defines which subframes are reserved for transmission or reception. The bitmap may comprise a relatively few number of bits (e.g. 8), and repeat until the end of the SC period (with the last repetition possibly being truncated). If the bitmap is set to include only null values, then no subframes are reserved for the data channel. The wireless terminal device must only monitor the control channel.

In such an embodiment, in which no data transfer is possible using the spare resource pool, a resume transition to the Full pool state 602 must be executed before data transfer can take place. A request for resume transition may therefore be transmitted or received using the control channel only in such embodiments.

The control channel may also be defined with respect to a bitmap, e.g. subframBitmap-r12. In order to increase power savings further, the bitmap for the control channel may be configured to contain only a single positive value (indicating that a particular subframe is allocated for transmission or reception). For instance, if the subframBitmap-r12=1000000000000000000000000000000000000000 ('1' followed by 39 '0's, or any variation thereof), the PSCCH resources would only be a single subframe. Such a configuration may be combined with embodiments in which TRPT=0 (i.e., there are no resources for the PSSCH). If the SL-PeriodComm-r12=sf320, the terminal devices would need to transmit or receive one ms every 320 ms. If the SL-PeriodComm-r12=sf40, the terminal devices would need to transmit or receive one ms every 40 ms.

It is also possible to extend the parameter SL-PeriodComm-r12 to include longer SC periods than 320 ms, e.g. 640 ms, 1280 ms, 2560 ms, 5120 ms, and/or 10240 ms to allow for more flexible periodicities.

As it is also possible to limit the bandwidth of the resource pool, the sparse resource pool could contain as little as a single subframe with a single resource block or possibly one for UL and one for DL.

In this embodiment, either or both of the wireless terminal devices involved in the sidelink radio connection may have another resource pool configuration (i.e. a Full or dense resource pool) available configured by the network node (e.g. eNB) through dedicated signaling or broadcasted in system information, which could be any of the standardized resource pools.

If there is DL data for the Remote UE in the eNB, the eNB may send this to the Relay UE which may send a message to the Remote UE on the sparse resource pool and both UEs would switch to the dense resource pool.

If the Remote UE has new UL data, it may send a signal to the Relay UE on the sparse resource pool and switch to the dense resource pool. When the Relay UE receives this message from the Remote UE, it switches to the dense resource pool.

Alternatively, the Relay UE can forward the message from the Remote UE to the eNB which may respond and instruct both the Relay UE and the Remote UE to switch to the dense resource pool.

The scenario described above is in the context of relaying (i.e. when a relay UE forwards communications from an eNB to a remote UE). However, the principles are equally application to devices operating in other sidelink scenarios (i.e. without relaying).

Thus, if the first wireless terminal device has data to transmit to a second wireless terminal device (or multiple secondary wireless terminal devices) it may send that data and/or a signal to the second wireless terminal device on the sparse resource pool and switch to the dense resource pool. When the second wireless terminal device (or multiple secondary wireless terminal devices) receives this data and/or signal from the first wireless terminal device, it (or they) may switch to the dense resource pool.

In a further alternative embodiment, a sparse resource pool may be configured so that the trigger to switch to a dense or full resource pool is sent as user plane data instead of control plane data. Such a communication channel may be defined for both Mode 1 and Mode 2, eNB controlled or UE controlled respectively.

Mode 1 scheduling dictates that the sidelink period (SC period) first consists of resources allocated for control signals (PSCCH) indicated by the parameter subframeBitmap, after which the remainder of the sidelink period consists of subframes allocated for data signals (PSSCH) with 8 subframe periodicities indicated by the TRPT. Thus even with the sparsest TRPT of e.g. 10000000, the PSSCH resources will recur every 8 ms until the end of the SC period.

For instance if SL-PeriodComm-r12=sf80, the SC period will be 80 ms. If the subframeBitmap is only 1000000000000000000000000000000000000000 ... , the PSCCH will consist of a single subframe and the PSSCH will begin at subframe 2. If TRPT=10000000 the PSSCH will have a sidelink resource every 8 ms repeated 9 times, until the end of the SC period.

Figure 7:
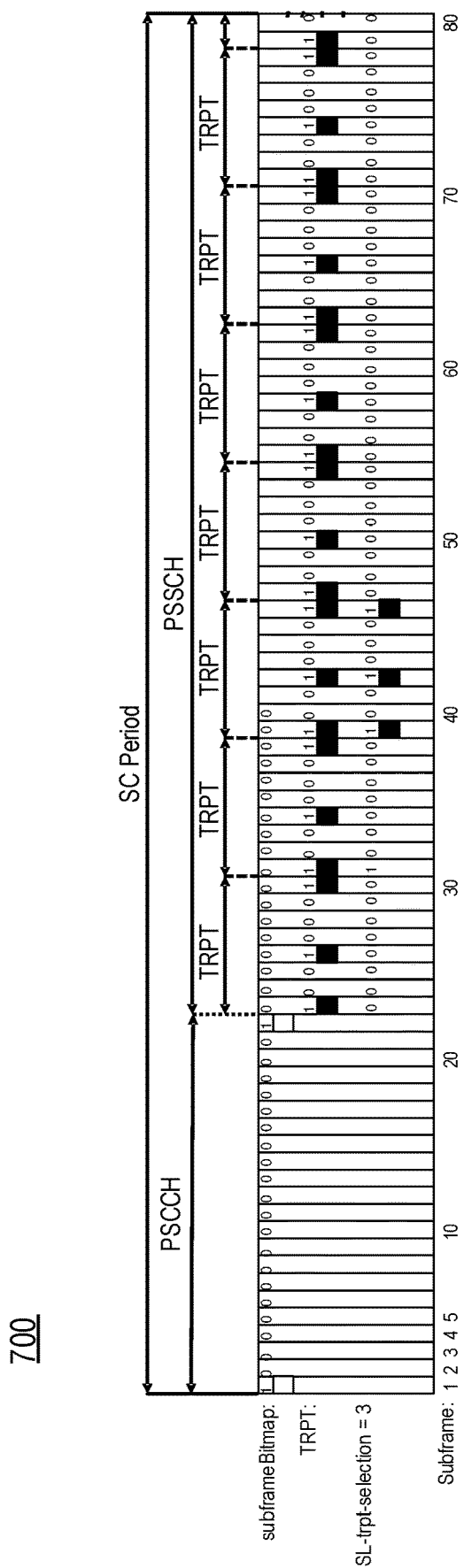
FIG. 7 illustrates a sidelink resource pool according to embodiments of the disclosure.

FIG. 7 shows a sparse resource pool in which a number of initial subframes are allocated for control signals (i.e. PSCCH), with the remaining subframes (which may be defined as the subframes remaining after the final positive subframe of those allocated for control signals) allocated to data transmissions. Thus, in the illustrated embodiment, the first subframe and the $22^{nd}$ subframe are utilized for the transmission of control data, and the remaining subframes after the $22^{nd}$ allocated for data transmissions. A repeated bitmap (the TRPT) defines which of those subframes are positively allocated to data transmissions, with seven complete repetitions of the bitmap and one partial repetition in the illustration.

In an embodiment of the disclosure, a new parameter is introduced to indicate one or more of the repetitions of the TRPT which is to be taken into consideration, with all other repetitions considered to be zero or null. In one embodiment, the parameter may indicate a single one of the repetitions which is to be taken into consideration. For example, the parameter may be defined as follows SL-trpt-selection=integer (0 . . . max(SL-PeriodComm-r12)/8)

For instance, if SL-PeriodComm-r12=sf80, and
subframeBit-
map=10000000000000000000010000000000000000000,
and TRPT=10010001, and
SL-trpt-selection=3, the resource pool is as shown in FIG. 7. Although data transmissions subframes are shown in grey boxes in subframes {23, 26, 30, 31, 34, 38, 39, 42, 46, 47, 50, 54, 55, 58, 62, 63, 66, 70, 71, 74, 78, 79}, by using the parameter SL-trpt-selection=3, only the third repetition of the TRPT is kept which corresponds to subframes {39, 42, 46} shown in black boxes.

In alternative embodiments, the parameter SL-trpt-selection may comprise an array or bitstring indicating either specific TRPT instances, i.e:

SL-trpt-selection=SEQUENCE (SIZE (1 . . . maxSlTrpt-Selection)) OF SlTrptSelection e.g. SL-trpt-selection=[3,6,8]

indicating that the third, sixth and eighth repetitions of the TRPT are to be taken into consideration.

As a further alternative, the TRPT selection could be indicated by a range of repetitions, using two parameters indicating the start and end of the range (or the start and the length of the range, or the end and the length of the range, etc);

SL-trpt-selection-start and SL-trpt-selection-end, i.e.
SL-trpt-selection-start=integer (0 . . . max(SL-Period-Comm-r12)/8)
SL-trpt-selection-end=integer (0 . . . max(SL-Period-Comm-r12)/8)

e.g.
SL-trpt-selection-start=3
SL-trpt-selection-end=7

Would indicate that SL-trpt-selection=[3,4,5,6,7].

The network node (which configures the resource pools in Mode 1) may ensure that the SL-trpt-selection parameter does not exceed the period set aside for sidelink communications.

For Mode 2, the possible resource pool for data transmission (i.e. PSSCH) may be indicated in system information (e.g. SIB18) with the parameter ue-SelectedResourceConfig-r12 containing a subframeBitmap. This subframeBitmap may or may not overlap with the subframeBitmap indicating the resources for control transmission, i.e. PSCCH (this is up to the network node to configure).

Figure 8:
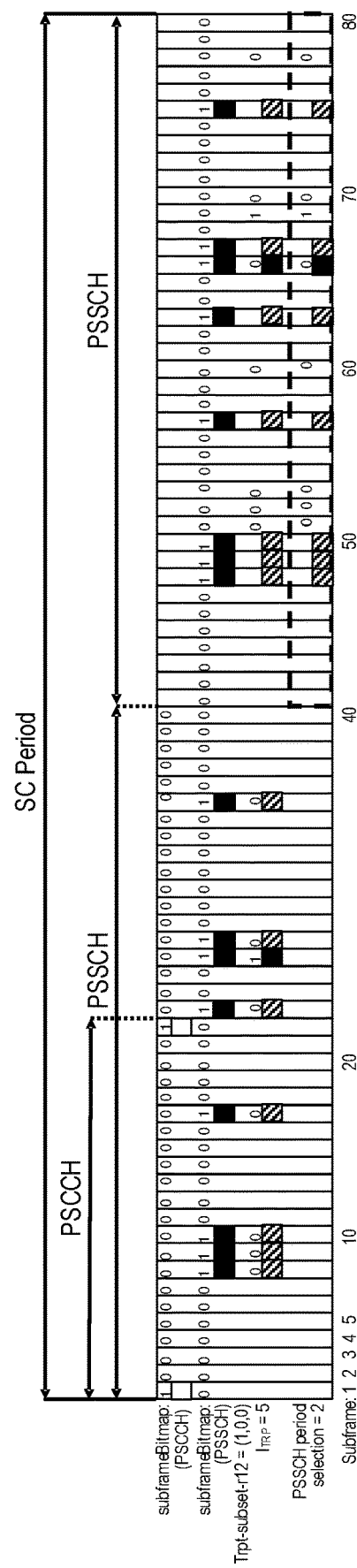
FIG. 8 illustrates a sidelink resource pool according to further embodiments of the disclosure.

Since the subframeBitmap for FDD according to Rel 13 of the 3GPP standards is at maximum 40 bits long (corresponding to 40 subframes or 40 ms) the minimum repetition rate of this resource pool is 40 ms. Those skilled in the art will appreciate that different values may apply to future standards, and to different transmission configurations (e.g. TDD). If the SC period is longer than 40 ms, the subframe-Bitmap is repeated and the last repetition could be truncated. Since the Tx wireless terminal device decides which TRP (time-resource pattern) to use (although the network node can decide how many positive values are to be used in each TRP instance, e.g. 1,2,4, etc), this means that a receiving wireless terminal device using the resource pool has to monitor all possible Tx resources. This is shown in FIG. 8 by the grey boxes on the 3rd line. Here, the PSSCH subframeBitmap contains eight '1's, and the PSSCH period is repeated twice in the 80 ms long SC period. Therefore there will be 16 PSSCH resources per SC period. In the illustration, the network node (e.g. eNB) has signaled trpt-subset-r12=(1,0,0) meaning that the transmitting wireless terminal device can select one Tx occasion on PSSCH per PSSCH period. The Tx wireless terminal device here selected $I_{TRP}$=5, meaning that TRP=(0,0,0,0,0,1,0,0), i.e. subframe 26 (see Table 14.1.1.1.1-1 in 3GPP 36.213, v13.3.0). This is then repeated in PSSCH period number 2, in subframe 66. If the SC period is longer, e.g. 320 ms, the Tx occasion would be repeated every 40 ms within that period. However, since the receiving wireless terminal device does not know which Tx occasion the transmitting wireless terminal device has selected, it has to monitor all resources indicated in the PSSCH subframeBitmap and thus cannot sleep for extended periods of time.

According to embodiments of the disclosure, a new parameter may be introduced (called PSSCH-period-selection in this example), that indicates one or more of the repetitions which are to be taken into account and monitored by a receiving device, with other repetitions being discarded and not monitored. In one embodiment, only a single repetition may be selected. In the illustration of FIG. 8, only a single repetition of the PSSCH period is selected (the second), and all other repetitions are disabled. Thus the receiving wireless terminal device may enter a sleep state (i.e. powering down some or all of its transceiver circuitry) in between those periods of active listening.

In the illustrated embodiment, where the period allocated for sidelink communications is only twice the size of the period allocated for data transmissions (i.e. the SC period is only twice the size of the PSSCH period), the power saving is relatively small. However, in the case when the SC period is larger e.g. 640 ms (i.e. 16× longer than the maximum PSSCH period) the sleep time will be much longer.

A further alternative embodiment for configuring the sparse resource pool is to utilize the discovery channel. The discovery channel is currently only used for transmitting discovery messages e.g. when different UEs approach each other, in order to discover each other and (potential) establish a sidelink radio connection. The transmission of a discovery message is then prompted by a proximity alert from the core network. See FIGS. 4 and 5.

According to embodiments of the disclosure, the wireless terminal devices may be configured with a sparse discovery resource pool, e.g. using dedicated RRC signaling configuring a parameter such as SL-DiscResourcePool. The wireless terminal devices may be configured so that when one of the devices is configured with a Tx discovery resource pool, the other device(s) would be configured with a Rx resource pool and vice versa. When one of the devices wants to switch to a denser resource pool, e.g. due to data available to transmit on the sidelink, the device transmits a message on the discovery channel. This message could either be a generic discovery message, or a specific message indicating that the device wants to switch resource pool.

In one embodiment, the devices may be configured with a sidelink control resource pool and/or a sidelink communication (i.e. data) resource pool, with the terminal devices simply activating the Tx and Rx on those resource pools responsive to a request to transfer to a dense resource pool received on the discovery channel. Alternatively, the wireless terminal devices may request from the network (e.g. from the eNB) configurations for the dense communication resource pool.

Figure 9:
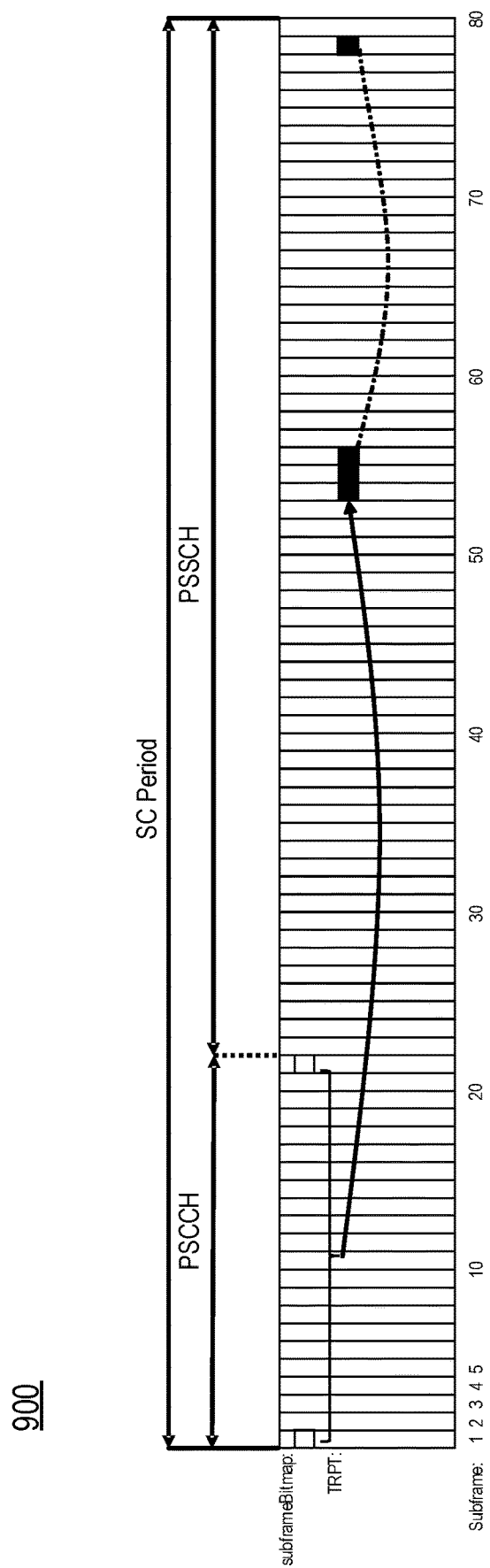
FIG. 9 illustrates a sidelink resource pool according to yet further embodiments of the disclosure.

A further alternative configuration of a spare resource pool is shown in FIG. 9. In this configuration, the resource pool for control signals (PSCCH) may be as defined above. That is, the resources for control signals may be allocated to a number of initial subframes within each period allocated for sidelink communications, with those subframes on which transmissions can take place being defined by a bitmap such as subframeBitmap.

However, according to embodiments of the disclosure, rather than utilizing a (possibly repeating) bitmap such as TRPT to indicate the resources for data transfer, the following information may be provided in the control signalling:

The timing offset (e.g.in subframes) between the data resources (PSSCH), e.g. the first subframe thereof, and its associated control resources (PSCCH)

Number of scheduling subframes which can be used for the data transmission

It may also include the interval for the adjacent burst transmission.

In order to increase the flexibility of the scheduling, the resource allocation information may also be piggybacked in the data transmission. As shown in FIG. 9, for the first transmission, the resource allocation depends on the PSCCH. After the first transmission, if there is still data in the buffer for transmission, the resource allocation information for a second transmission can be piggybacked in the data for the first transmission. Once the receiving device decodes the data, it can get the resource allocation information, and thus knows the physical resources on which to receive the new data transmission.

This method can be combined with any of the embodiments described above. For example, if combined with an embodiment utilizing the discovery channel, the first resource allocation can be transmitted via discovery packets.

In further embodiments of the disclosure, the sparse resource pool may be configured in a further alternative way. The previous embodiments defined the sparse resource pool by exploiting legacy procedures and channels, i.e. the PSCCH, PSSCH, and PSDCH for a UE to signal that it has data to transmit. However, it is also possible to define a whole new channel, e.g. a physical sidelink DRX channel (e.g. PSDRXCH).

This channel could be configured in a similar way as the PSDCH and PSCCH, using a parameter, e.g. SL-TF-ResourceConfig-r12, to define which subframes and resource blocks to use. In addition, the DRX channel would have a parameter drx-Period-rxx, independent of the sc-Period-r12 and discPeriod-r12, indicating the length of the period on the DRX channel. All other applicable parameters defining PSCCH and PSDCH could be reused.

The parameters for the PSDRXCH could be signaled in system information from a network node (e.g. eNB), either in an extended existing SIB (e.g. SIB18 or SIB19), or a new SIB.

Alternatively, the parameters could be transmitted to the wireless terminal devices using dedicated RRC signaling which could be triggered by the network (e.g. the eNB) or the wireless terminal devices.

For all of the embodiments set out above, as the resource pool can configure a limited set of resource blocks, the sparse resource pool can be both sparse in time (subframes) as well as frequency (resource blocks).

Having defined the sparse resource pool configuration above, the following parts of the disclosure describe methods by which a wireless terminal device may switch from the sparse resource pool to a dense resource pool, or from the dense resource pool to the sparse resource pool.

Figure 12:
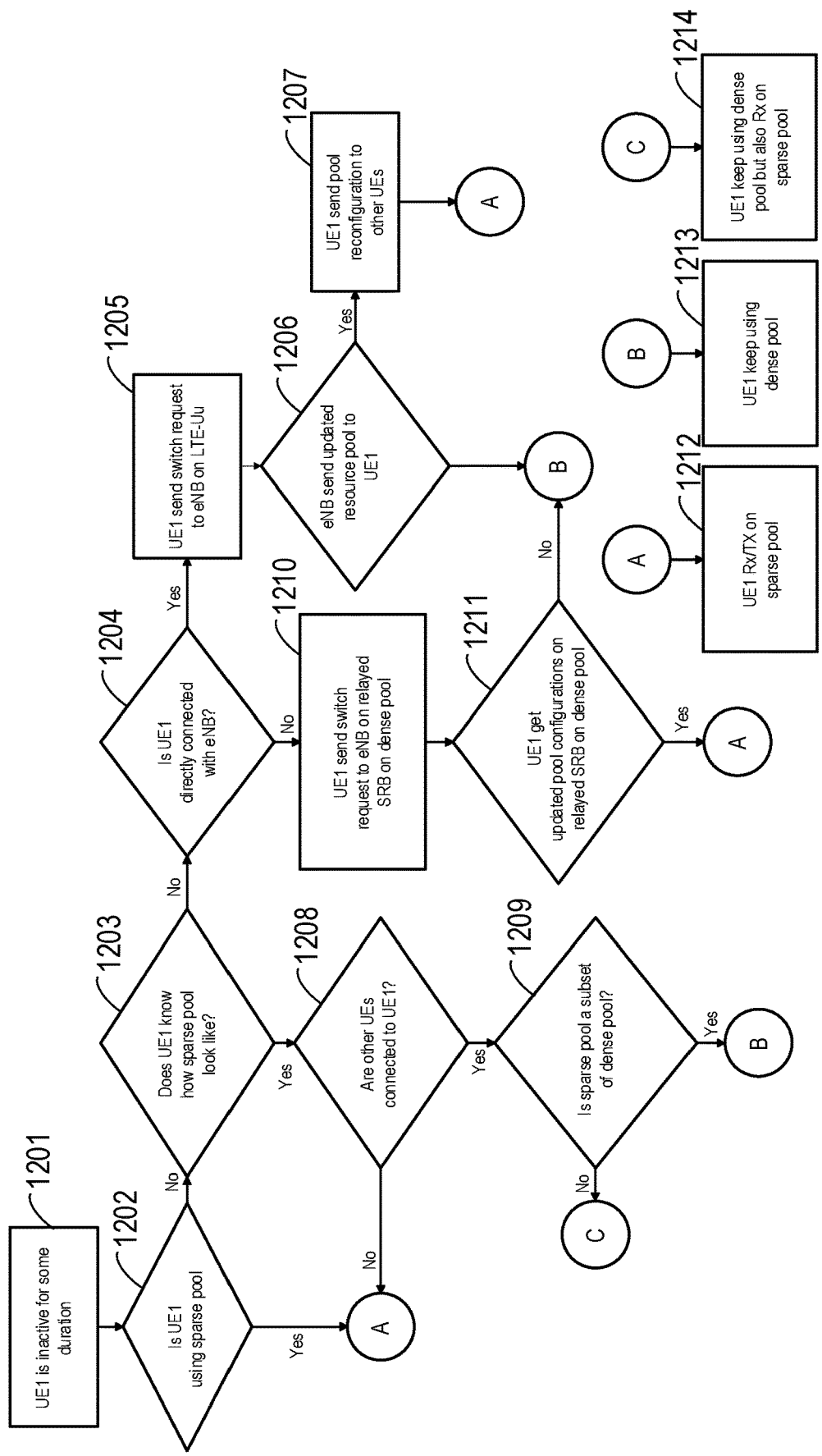
FIG. 12 is a flowchart of a method according to yet further embodiments of the disclosure.

For example, a wireless terminal device may switch from a dense to a sparse resource pool in response to inactivity (see FIG. 12). A wireless terminal device may switch from a sparse resource pool to a dense resource pool in response to a determination that it has data to transmit, or in response to a determination that it has received data or a request over the sidelink.

The request to switch resource pools may come from a node not involved in the sidelink connection, such as a network node (e.g. eNB) or another wireless terminal device (such as one that is attempting to use a similar resource pool to the resource pool for the established connection). Alternatively, the request to switch resource pools may come from a node that is involved in the sidelink connection, such as i. UE involved in transmitting data on sidelink (e.g. Remote UE transmitting data)
ii. UE involved in receiving data on sidelink (e.g. Relay UE receiving data)
iii. UE involved in both sending and receiving data on sidelink.
iv. UE involved in both sending and receiving data on sidelink to multiple UEs (e.g. Relay UE relaying for multiple Remote UEs).
v. UE involved in one-to-one ProSe direct communication, also known as unicast D2D communication.
vi. UE involved in one-to-many ProSe direct communication, also known as multicast D2D communication.

The decision to switch may be signalled to other nodes in a variety of different manners. For example, explicit signalling may be used by i. A network node (e.g. eNB) sends a reconfiguration or switching command to the first wireless terminal devices to switch resource pool
ii. the first wireless terminal device involved in the sidelink connection sends a switching command to the second wireless terminal devices and/or a network node (eNB), and the second wireless terminal devices may respond with a confirmation
iii. the first wireless terminal device involved in the sidelink connection sends a switching request to the second wireless terminal devices and/or a network node (eNB), and the second wireless terminal devices and/or the network node respond with a switching acknowledgement (ACK/NACK).
iv. the first wireless terminal devices involved in the sidelink connection sends a switching announcement to the second wireless terminal devices and/or a network node (e.g. eNB) to inform it that it has switched resource pool.

In other embodiments, implicit signalling may be used as follows:

i. If wireless terminal devices are using a sparse resource pool, the presence of data may indicate that the wireless terminal devices should switch to a dense resource pool.
ii. Buffer status report/end of data information, in which a transmitting wireless terminal device signals the amount of data that will be sent such that, when finished, all involved wireless terminal devices may switch to a sparse resource pool.

In further embodiments, a timer may be used to control and indicate switching of resource pools, with switching taking place in both devices once respective timers activated in the wireless terminal devices expire (both being configured with corresponding values). In these embodiments, neither wireless terminal device needs to inform the other once the resource pool switch has taken place.

The timer value may be configured by the network (e.g. a network node such as the eNB, configuring the value by dedicating or broadcast signalling), or may be preconfigured and/or standardized, or may be configured by higher layers such as the application layer (e.g. based on information about traffic patterns provided by those higher layers).

Depending on the direction of the switch, which node makes the decision, as well as which signaling is used, the listed alternatives can be combined in many different ways.

Note that there may be multiple resource pools in the wireless terminal devices, either standardized default configurations, preconfigured or signaled by the network. These resource pools may be:

Simultaneously used, where the resource pools are partially or non-overlapping, e.g. a first wireless terminal device acting as a Relay UE has different resource pools for each wireless terminal devices connected to the first wireless terminal device as a Remote UE.

Simultaneously configured, but not activated in the wireless terminal devices, where the wireless terminal devices can switch from a set of resource pools to another set of resource pools without additional information on what the resource pools look like, since the wireless terminal devices already has that information. The different sets may be fully, partially, or non-overlapping in resources.

The network (e.g. the eNB) can signal to the wireless terminal devices to change, add, or remove a single or a set of resource pools.

Figure 10:
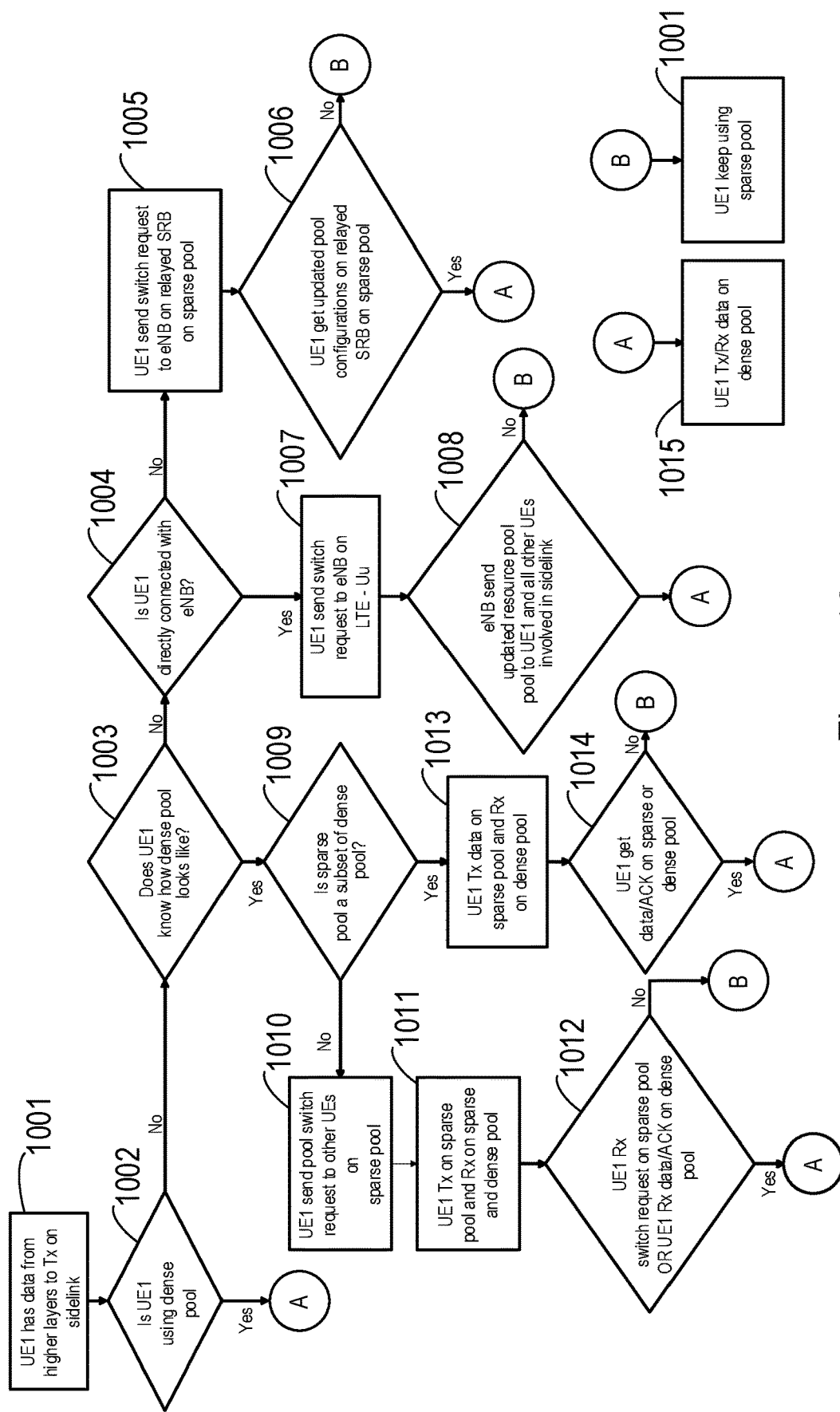
FIG. 10 is a flowchart of a method according to embodiments of the disclosure.

FIG. 10 is a flow chart showing a method for deciding to switch from sparse to dense resource pool due to data to transmit on an established sidelink radio connection between two wireless terminal devices UE1 and UE2.

The steps in FIG. 10 are the following:

1001. UE1 has data from higher layers to transmit on the sidelink to UE2

1002. Is UE1 using a dense resource pool?—if it is already using a sufficiently dense resource pool, there is no need to switch.

1003. Does UE1 know what the dense resource pool looks like? It is possible that UE1 can know the configuration of multiple resource pools but only use one or some of them.

1004. Is UE1 directly connected with an eNB? UE1 can be either a Remote UE, a Relay UE, or a UE involved in 1-1 sidelink communication. Of these examples, only the Relay UE is directly connected to the eNB.

1005. UE1 sends a switch request to the eNB on relayed Signalling Radio Bearer (SRB) on sparse resource pool. Since UE1 doesn't have a direct connection to the eNB and it doesn't have a dense resource pool configured, it has to receive updated configurations from the eNB.

1006. UE1 get updated resource pool configurations on relayed SRB on sparse resource pool? The eNB can respond to the request in step 5 with updated pool configurations, or it can reject/ignore the request. Since UE1 doesn't have direct connection to eNB, the updated configurations must be relayed via a relayed SRB.

1007. UE1 sends a switch request to eNB over the direct link (e.g. LTE-Uu). Since UE1 has a direct connection to the eNB, but doesn't have resource pool configurations for dense resource pool it requests a switch of resource pool from the eNB.

1008. eNB sends updated resource pool to UE1 and all other UEs involved in sidelink? The eNB can update the resource pools of UE1 and the other UEs which UE1 communicates with on sidelink.

1009. Is sparse resource pool a subset of dense pool? Since UE1 has both sparse and dense resource pool (but is using sparse resource pool), the relation between the resource pools can be either partly or fully overlapping or disjoint.

1010. UE1 sends pool switch request to other UEs on sparse resource pool. Since sparse and dense resource pools are disjoint, other UEs will not receive on the dense resource pool and UE1 has to transmit on the sparse resource pool for other UEs to receive the command.

1011. UE1 transmits on the sparse resource pool and receives on the sparse and dense resource pools. Since UE1 doesn't know whether other UEs have switched to (disjoint) dense resource pool it continues to transmit on a sparse resource pool. However, it can start listening to dense Rx resource pool while continuing to listen to the sparse Rx resource pool 1012. UE1 Rx switch request on sparse resource pool OR UE1 Rx data/ACK on dense resource pool. If UE1 receives switch request on sparse resource pool or an ACK or data on dense resource pool it can know that the other UEs are using the dense resource pool and UE1 can stop using the sparse resource pool 1013. UE1 transmits data on sparse resource pool and receives on dense resource pool. Since the sparse resource pool is a subset of the dense resource pool, if UE1 transmits on the sparse resource pool and listens on the dense resource pool it can make sure that other UEs will hear the Tx but UE1 will hear Rx if sent on dense resource pool from other UEs.

1014. UE1 get data/ACK on sparse or dense resource pool. Since UE1 listens to dense resource pool which includes sparse pool it can receive data/ACK on either of them 1015. UE1 Tx/Rx data on dense resource pool. Since UE1 has received confirmation that other UEs are using dense resource pool, UE1 can stop using the sparse resource pool 1016. UE1 keep using sparse resource pool. Since UE1 has not received any configurations for the dense resource pool or hasn't received any confirmations that other UEs are using the dense resource pool, it has to continue to use the sparse resource pool.

Figure 11:
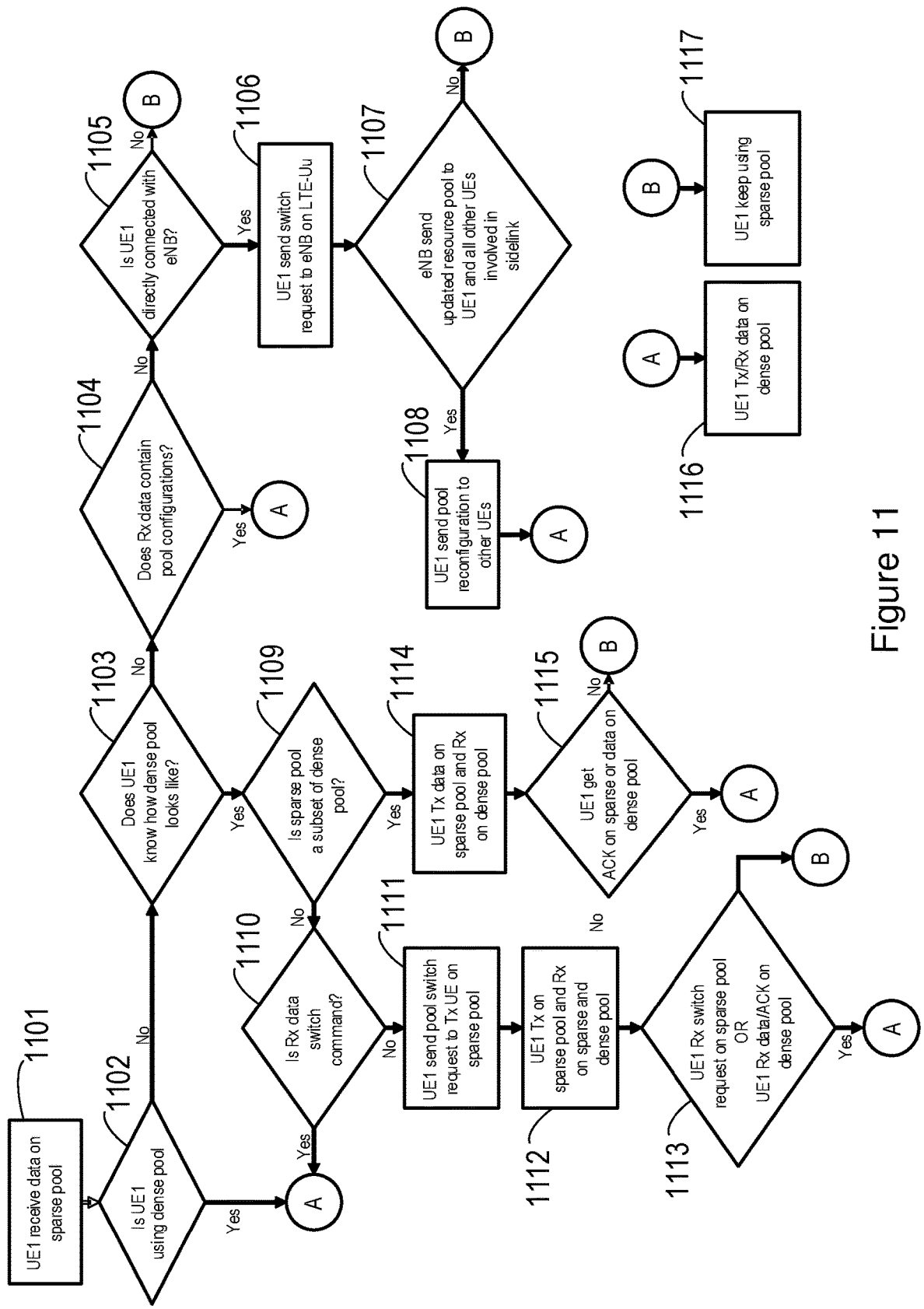
FIG. 11 is a flowchart of a method according to further embodiments of the disclosure.

The switch of resource pool from a sparse resource pool to a dense resource pool in the UE can also be triggered by a reception of data on the sparse resource pool of an established sidelink as shown in FIG. 11.

The steps in FIG. 11 are:

1101. UE1 receive data on sparse resource pool. UE1 is configured with a sparse resource pool for sidelink and another UE transmits data on this resource which UE1 receives 1102. Is UE1 using a dense resource pool?—if it is already using a sufficiently resource pool, there is no need to switch 1103. Does UE1 know what the dense resource pool looks like? It is possible that UE1 can know the configuration of multiple resource pools but only use some of them.

1104. Does Rx data contain resource pool configurations? If the received data on the sparse resource pool is a configuration for a dense resource pool, UE1 applies these configurations.

1105. Is UE1 directly connected with eNB? Since UE1 doesn't have any configurations for the dense resource pool it needs to receive these from the eNB. Since UE1 doesn't have any own data to transmit, and the other UE hasn't requested UE1 to switch to a dense resource pool, UE1 should continue to use the sparse resource pool.

1106. UE1 sends switch request to eNB over the direct interface (e.g. LTE-Uu). Since UE1 has direct connection to eNB, but doesn't have resource pool configurations for dense pool it requests eNB to switch pool.

1107. Did the eNB send updated resource pool to UE1 and all other UEs involved in sidelink? The eNB can update the resource pools of UE1 and the other UEs which UE1 communicates with on sidelink.

1108. UE1 sends resource pool reconfiguration to other UEs. Since the original transmission was sent from a UE without indicating to switch to dense resource pool, but UE1 is connected to eNB, the other UE could be a remote UE without connection to the eNB. In that case UE1 should reconfigure the other UE with the dense resource pool.

1109. Is sparse resource pool a subset of dense resource pool? Since UE1 has both sparse and dense resource pool (but is using sparse resource pool), the relation between the resource pools can be either partly or fully overlapping or disjoint.

1110. Is Rx data a switch command? If the other UE transmit a switch command, UE1 should switch to the configured dense resource pool.

1111. UE1 send pool switch request to other UEs on sparse resource pool. Since sparse and dense resource pool are disjoint, other UEs will not Rx on dense resource pool and UE1 has to Tx on sparse resource pool for other UEs to receive command.

1112. UE1 Tx on sparse resource pool and Rx on sparse and dense resource pool. Since UE1 doesn't know whether other UEs switch to (disjoint) dense resource pool it continues to transmit on sparse resource pool. However, it can start listening to dense Rx resource pool while continuing to listen to the sparse Rx resource pool 1113. UE1 Rx switch request on sparse pool OR UE1 Rx data/ACK on dense resource pool. If UE1 receives switch request on sparse pool or an ACK or data on dense resource pool it can know that the other UEs are using the dense resource pool and UE1 can stop using the sparse resource pool 1114. UE1 Tx data on sparse resource pool and Rx on dense resource pool. Since sparse resource pool is a subset of dense resource pool, if UE1 transmits on sparse resource pool and listens on dense resource pool it can make sure that other UEs will hear the Tx but UE1 will hear Rx if sent on dense resource pool from other UEs.

1115. UE1 get ACK on sparse resource pool or data on dense resource pool. Since UE1 listens to dense resource pool which includes sparse resource pool it can receive data/ACK on either of them. If the other UE sends data on dense resource pool, UE1 will know to use the dense resource pool Likewise if the other UE send an ACK on the sparse resource pool, UE1 will know that it can stop using the sparse resource pool 1116. UE1 Tx/Rx data on dense resource pool. Since UE1 has received confirmation that other UEs are using dense resource pool, UE1 can stop using the sparse resource pool 1117. UE1 keep using sparse resource pool. Since UE1 has not received any configurations for the dense resource pool or hasn't received any confirmations that other UEs are using the dense resource pool, it has to continue to use the sparse resource pool.

A switch from a dense resource pool to a sparse resource pool on an established sidelink radio connection can be triggered by inactivity, such as when a UE hasn't transmitted or received data over the sidelink connection by the time a timer expires.

FIG. 12 shows a flow chart for deciding to switch from dense to sparse resource pool due to inactivity.

The steps in FIG. 12 are:

1201. UE1 is inactive for some duration. UE1 has a timer which expires due to inactivity, i.e. no transmissions or receptions on sidelink.

1202. Is UE1 using a sparse resource pool?—if it is already using a power saving resource pool, there is no need to switch 1203. Does UE1 know what the sparse resource pool looks like? It is possible that UE1 can know the configuration of multiple resource pools but only use some of them.

1204. Is UE1 directly connected with eNB? Since UE1 doesn't have any configurations for the sparse resource pool it needs to receive these from the eNB.

1205. UE1 send switch request to eNB on the direct connection (e.g. LTE-Uu). Since UE1 has direct connection to eNB, but doesn't have resource pool configurations for sparse resource pool it sends a switch request to eNB to switch resource pool.

1206. eNB send updated resource pool to UE1. When UE1 receives the updated resource poll configuration, it applies them and uses a sparse (power saving) resource pool.

1207. UE1 send resource pool reconfiguration to other UEs. Since UE1 is connected to eNB, the other UE could be a remote UE without connection to the eNB. In that case UE1 should reconfigure the other UE with the sparse resource pool 1208. Are other UEs connected to UE1? If UE1 is a relay UE with multiple remote UEs, inactivity of one remote UE shouldn't affect the other remote UEs.

1209. Is sparse resource pool a subset of dense resource pool? Since UE1 has both sparse and dense resource pool (but is using sparse resource pool), the relation between the resource pools can be either partly or fully overlapping or disjoint. Since there are multiple UEs connected to UE1, UE1 cannot switch to sparse resource pool 1210. UE1 send switch request to other eNB on relayed SRB on dense resource pool. Since UE is not connected directly to eNB, and is not configured with a sparse resource pool, it has to send a switch request to the eNB via a relayed SRB.

1211. UE1 get updated resource pool configurations on relayed SRB on dense resource pool. The eNB can respond to UE1s switch request with an updated resource pool configuration.

1212. UE1 Tx/Rx data on sparse resource pool. Since UE1 has received confirmation that other UEs are using sparse resource pool, UE1 can stop using the dense resource pool.

1213. UE1 keep using dense resource pool. Since UE1 has not received any configurations for the sparse resource pool or hasn't received any confirmations that other UEs are using the sparse resource pool, it has to continue to use the dense resource pool.

1214. UE keep using dense resource pool but also Rx on sparse resource pool. Since UE1 is connected to multiple UEs and the sparse and dense resource pools as disjoint, UE1 has to listen to both resource pools.

Figure 13:
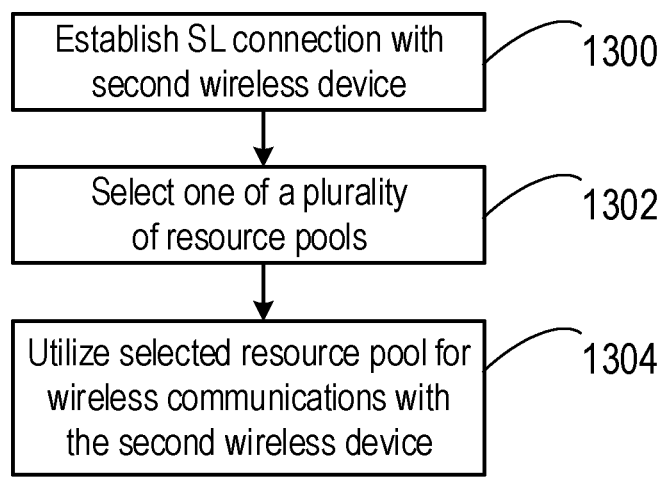
FIG. 13 is a flowchart of a method according to further embodiments of the disclosure.

FIG. 13 is a flowchart of a method according to embodiments of the disclosure. The method may be carried out in a first wireless terminal device, such as any of the UEs described above.

In a first step 1300, the first wireless terminal device establishes a sidelink radio connection with a second wireless terminal device. In a second step 1302, the first wireless terminal device selects one of a plurality of resource pools for wireless communication over the sidelink radio connection. The plurality of resource pools comprise a first resource pool and a second resource pool, with the first resource pool defining a first subset of available physical resources and the second resource pool defining a second subset of available physical resources. In a third step 1304, the first wireless terminal device utilizes the selected resource pool for transmitting wireless communications to the second wireless terminal device, or receiving wireless communications from the second wireless terminal device.

Figure 14:
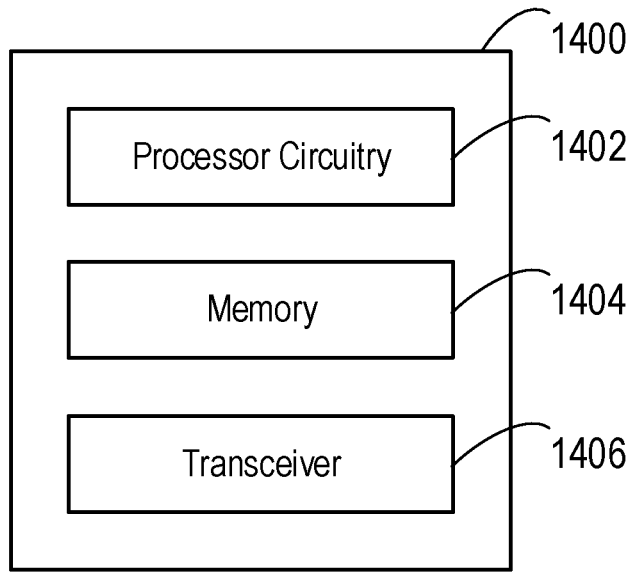
FIG. 14 is a schematic diagram of a wireless terminal device according to embodiments of the disclosure.

FIG. 14 shows a wireless terminal device 1400 according to embodiments of the disclosure. The device 1400 comprises processor circuitry 1402, a non-transitory computer-readable medium 1404 (such as memory), and a transceiver 1404.

The processor circuitry 1402 is coupled to the memory 1404 and the transceiver. The memory 1404 may comprise coded instructions which, when executed by the processor circuitry, cause the processor circuitry to: establish a sidelink radio connection with a second wireless terminal device; select one of a plurality of resource pools for wireless communication over the sidelink radio connection, the plurality of resource pools comprising a first resource pool and a second resource pool, the first resource pool defining a first subset of available physical resources and the second resource pool defining a second subset of available physical resources; and utilize the selected resource pool for transmitting wireless communications to the second wireless terminal device, or receiving wireless communications from the second wireless terminal device.

Figure 15:
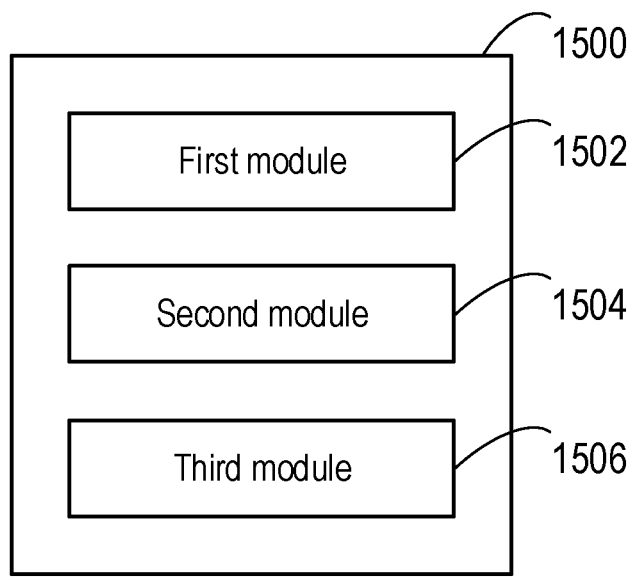
FIG. 15 is a schematic diagram of a wireless terminal device according to further embodiments of the disclosure.

FIG. 15 shows a wireless terminal device 1500 according to embodiments of the disclosure. The device 1500 comprises a first module 1502, a second module 1504 and a third module 1506. The first module 1502 is configured to establish a sidelink radio connection with a second wireless terminal device. The second module 1504 is configured to select one or multiple of a plurality of resource pools for wireless communication over the sidelink radio connection, the plurality of resource pools comprising a first resource pool and a second resource pool, the first resource pool defining a first subset of available physical resources and the second resource pool defining a second subset of available physical resources. The third module is configured to utilize the selected resource pool for transmitting wireless communications to the second wireless terminal device, or receiving wireless communications from the second wireless terminal device.

The present disclosure thus provides methods and apparatus for resource pool configuration in a sidelink radio connection between wireless terminal devices. In particular, a sparse resource pool is defined that allows a wireless terminal device to power down some or all of its transceiver circuitry between periods of active listening or transmission, thus saving power. Further, methods are defined for switching between the sparse resource pool and a denser resource pool, so that a wireless terminal device may rapidly and efficiently transmit data using the denser resource pool when necessary.

Although described in the context of the 3GPP specifications and particularly the developments to Long Term Evolution, the concepts disclosed herein are equally applicable to other wireless communication networks and standards. For example, where a particular LTE parameter is used to describe a concept (such as timing offsets, bitmaps, etc), those skilled in the art will appreciate that analogous parameters may be used without departing from the scope of the claims appended hereto.

The invention claimed is:

1. A method in a first wireless terminal device, the method comprising:
    establishing a sidelink radio connection with a second wireless terminal device;
    selecting one of a plurality of resource pools for wireless communication over the sidelink radio connection, the plurality of resource pools comprising a first resource pool and a second resource pool, the first resource pool defining a first subset of available physical resources and the second resource pool defining a second subset of available physical resources, and wherein the second subset of available physical resources is sparse in at least one of time and frequency in comparison to the first subset of available physical resources and correspondingly supports only limited or no data signaling over the sidelink radio connection in comparison to the first subset of available physical resources; and
    utilizing the selected resource pool for transmitting wireless communications to the second wireless terminal device, or receiving wireless communications from the second wireless terminal device.

2. A first wireless terminal device, comprising:
    processing circuitry; and
    a computer-readable medium, the computer-readable medium storing instructions that, when executed by the processing circuitry, cause the first wireless terminal device to:
        establish a sidelink radio connection with a second wireless terminal device;
        select one of a plurality of resource pools for wireless communication over the sidelink radio connection, the plurality of resource pools comprising a first resource pool and a second resource pool, the first resource pool defining a first subset of available physical resources and the second resource pool defining a second subset of available physical resources, and wherein the second subset of available physical resources is sparse in at least one of time and frequency in comparison to the first subset of available physical resources and correspondingly supports only limited or no data signaling over the sidelink radio connection in comparison to the first subset of available physical resources; and
        utilize the selected resource pool for transmitting wireless communications to the second wireless terminal device, or receiving wireless communications from the second wireless terminal device.

3. The first wireless terminal device according to claim 2, wherein the second subset of available physical resources comprises a first secondary subset for control signals and a second secondary subset for data signals.

4. The first wireless terminal device according to claim 3, wherein the first secondary subset comprises a number of consecutive initial subframes of a period allocated for sidelink communications, and the second secondary subset comprises remaining subframes of the period allocated for sidelink communications.

5. The first wireless terminal device according to claim 4, wherein the second secondary subset is configured with reference to multiple repetitions of a block of subframes in the remaining subframes.

6. The first wireless terminal device according to claim 3, wherein the selected resource pool is the second resource pool, and wherein the computer-readable medium stores instructions that, when executed by the processing circuitry, cause the first wireless terminal device to receive a command to switch to another resource pool of the plurality of resource pools using the first secondary subset.

7. The first wireless terminal device according to claim 2, wherein the second pool comprises only control-signaling resources and wherein the control-signaling resources of the second pool are sparser than control-signaling resources in the first pool.

8. The first wireless terminal device according to claim 2, wherein the computer-readable medium further stores instructions that, when executed by the processing circuitry, cause the first wireless terminal device to:
receive configuration information for a data channel and a control channel, the data channel and the control channel utilizing the first resource pool; and
receive configuration information for a separate, discontinuous channel utilizing the second resource pool.

9. The first wireless terminal device according to claim 2, wherein the first wireless terminal device is further connected to a network node of a wireless communications network.

10. The first wireless terminal device according to claim 9, wherein the first wireless terminal device is configured to relay communications from the network node to the second wireless device, and to relay communications from the second wireless terminal device to the network node.

11. The first wireless terminal device according to claim 2, wherein the computer-readable medium further stores instructions that, when executed by the processing circuitry, cause the first wireless terminal device to:
switch to another resource pool of the plurality of resource pools for transmitting wireless communications to the second wireless terminal device, or receiving wireless communications from the second wireless terminal device.

12. The first wireless terminal device according to claim 11, wherein the first wireless terminal device is configured to switch to another resource pool by switching from the first resource pool to the second resource pool responsive to one of:
a determination that a timer activated upon a most recent transmission or reception has expired;
a determination that the first wireless terminal device has become disconnected from an external power source;
a determination that a battery level in the first wireless terminal device is below a threshold value; and
a determination that a channel quality of the sidelink radio connection is below a threshold value.

13. The first wireless terminal device according to claim 11, wherein the first wireless terminal device is configured to switch to another resource pool by switching from the second resource pool to the first resource pool responsive to one of:

a determination that the first wireless terminal device has more than a threshold amount of data to transmit;
reception of data by the first wireless terminal device from the second wireless terminal device utilizing the second resource pool;
a determination that a timer activated upon the first wireless terminal device switching to the second resource pool has expired;
a determination that the first wireless terminal device is connected to an external power source;
a determination that a channel quality of the sidelink radio connection is above a threshold value; and
a determination that a user of the first wireless terminal device has requested a low-latency service.

14. The first wireless terminal device according to claim 11, wherein the first wireless terminal device is configured to switch to another resource pool by switching to an additional resource pool of the plurality of resource pools, and utilizing the additional resource pool simultaneously with the selected resource pool.

15. The first wireless terminal device according to claim 11, wherein the first wireless terminal device is configured to switch to another resource pool by switching to another resource pool of the plurality of resource pools responsive to receipt of a request message from one or more of the second wireless terminal device and a network node.

16. The first wireless terminal device according to claim 2, wherein the first wireless terminal device is configured to utilize the selected resource pool by utilizing one of the first and second resource pools for transmitting wireless communications to the second wireless terminal device, and utilizing the other of the first and second resource pools for receiving wireless communications from the second wireless terminal device.

17. The first wireless terminal device according to claim 2, wherein the second subset defines one or more of:
fewer physical resources than the first subset;
physical resources that are more spaced apart in time than the first subset; and
physical resources that have a narrower bandwidth than the first subset.

18. The first wireless terminal device according to claim 2, wherein the selected resource pool is the second resource pool, wherein the computer-readable medium further stores instructions that, when executed by the processing circuitry, cause the first wireless terminal device to:
deactivate one or more of transmit and receive circuitry in the first wireless terminal device during a period of inactivity.

* * * * *